United States Patent
Chen et al.

(10) Patent No.: US 9,600,673 B2
(45) Date of Patent: Mar. 21, 2017

(54) METHOD AND DEVICE FOR RISK EVALUATION

(71) Applicant: INDUSTRIAL TECHNOLOGY RESEARCH INSTITUTE, Hsinchu (TW)

(72) Inventors: Ya-Ling Chen, Hsinchu (TW); Ding-Jun Yin, Tainan (TW); Kuo-Yang Hung, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 92 days.

(21) Appl. No.: 14/573,908

(22) Filed: Dec. 17, 2014

(65) Prior Publication Data
US 2015/0106944 A1    Apr. 16, 2015

Related U.S. Application Data

(62) Division of application No. 13/728,684, filed on Dec. 27, 2012, now Pat. No. 9,129,117.

(30) Foreign Application Priority Data

Dec. 27, 2012    (TW) .............................. 101150619 A

(51) Int. Cl.
*G06F 21/00* (2013.01)
*G06F 21/57* (2013.01)
(Continued)

(52) U.S. Cl.
CPC ...... *G06F 21/577* (2013.01); *G06F 17/30289* (2013.01); *G06F 17/30424* (2013.01); *G06F 21/6254* (2013.01); *G06F 2221/034* (2013.01)

(58) Field of Classification Search
CPC .. G06F 21/6254; G06F 21/6227; G06F 21/60; G06F 21/6245; G06F 21/577;
(Continued)

(56) References Cited

U.S. PATENT DOCUMENTS

| | | | |
|---|---|---|---|
| 7,269,578 B2 | 9/2007 | Sweeney | |
| 7,475,085 B2 | 1/2009 | Aggarwal et al. | |

(Continued)

FOREIGN PATENT DOCUMENTS

| | | |
|---|---|---|
| CN | 101834872 A | 9/2010 |
| WO | 2011145401 A1 | 11/2011 |

OTHER PUBLICATIONS

Lu et al. An Improved weighted feature clustering algorithm for k-anonymity (included in applicant's IDS).*

(Continued)

*Primary Examiner* — Kendall Dolly
(74) *Attorney, Agent, or Firm* — Locke Lord LLP; Tim Tingkang Xia, Esq.

(57) ABSTRACT

A risk evaluation method and a risk evaluation device for evaluating an anonymous dataset generated according to an original dataset are provided. The risk evaluation method comprises the following steps. Acquiring a plurality of appearing times respectively corresponding to a plurality of original values of the original dataset. Generating a partition set and a weight table according to a sample parameter, an anonymous parameter and the appearing times. Dividing the original dataset into a plurality of data partitions according to the partition set, and generating a penetration dataset according to the weight table and the data partitions, wherein the penetration dataset comprises a plurality of sample data. Comparing each sample data with a plurality of anonymous data of the anonymous dataset to obtain a plurality of matching quantities respectively corresponding to the
(Continued)

sample data. And calculating and outputting a risk evaluation result according to the matching quantities.

20 Claims, 16 Drawing Sheets

(51) Int. Cl.
 *G06F 17/30* (2006.01)
 *G06F 21/62* (2013.01)
(58) Field of Classification Search
 CPC ............... G06F 19/324; G06F 19/327; G06F 17/30424; G06F 17/30289; G06F 2221/034
 See application file for complete search history.

(56) References Cited

U.S. PATENT DOCUMENTS

| | | | |
|---|---|---|---|
| 7,676,454 | B2 | 3/2010 | Dwork et al. |
| 2002/0169793 | A1 | 11/2002 | Sweeney |
| 2008/0005106 | A1* | 1/2008 | Schumacher ..... G06F 17/30489 |
| 2010/0077006 | A1 | 3/2010 | El Emam et al. |
| 2010/0114920 | A1 | 5/2010 | Srivastava et al. |
| 2010/0332537 | A1 | 12/2010 | El Emam et al. |
| 2011/0258206 | A1* | 10/2011 | El Emam .............. G06F 21/577 707/754 |
| 2011/0277037 | A1 | 11/2011 | Burke et al. |
| 2012/0036135 | A1 | 2/2012 | Fu et al. |
| 2013/0031061 | A1 | 1/2013 | Jagota |

OTHER PUBLICATIONS

Khaled El Emam et al., Protecting Privacy Using k-Anonymity, Journal of the American Medical Informatics Association, 2008, p. 627-637, vol. 15, No. 5.

Qingming Tang et al., Utility-Based k-Anonymization, p. 318-323.
Slava Kisilevich et al., Efficient Multidimensional Suppression for k-Anonymity, IEEE Transactions on Knowledge and Data Engineering, 2010, p. 334-347, vol. 22, No. 3.
P. Deivanai et al., A Hybrid Data Anonymization integrated with Suppression for Preserving Privacy in mining multi party data, IEEE-International Conference on Recent Trends in Information Technology, 2011, p. 732-736.
Yu Fu et al., A Privacy Protection Technique for Publishing Data Mining Models and Research Data, ACM Transactions on Management, Information Systems, 2010, p. 7-7:20, vol. 1, No. 1.
Intellectual Property Office, Ministry of Economic Affairs, R. O. C, "Office Action", Sep. 9, 2015, Taiwan.
Jiuyong Li et al., "Achieving k-Anonymity by Clustering in Attribute Hierarchical Structures", Data Warehousing and Knowledge Discovery, Proceedings of 8th International Conference, 2006.
Wang, Ke et al., Bottom-up generalization: A data mining solution to privacy protection, Data Mining, 2014. ICDM'04. Fourth IEEE International Conference on. IEEE, 2004.
Domingo-Ferrer, Josep et al., "Ordinal, continuous and heterogeneous k-anonymity through microaggregation." Data Mining and Knowledge Discovery, 11.2 (2005): 195-212.
Byun, Ji-Won et al., "Efficient k-anonymization using clustering techniques", Advances in Databases: Concepts, Systems and Applications. Springer Berlin Heidelberg, 2007,188-200.
Lu, Lijian et al., "An improved weighted-feature clustering algorithm for k-anonymity", Information Assurance and Security, 2009, IAS' 09, Fifth International Conference on vol. 1. IEEE, 2009.
Fung, Benjamin C. M. et al., "Privacy-preserving data publishing : A survey of recent developments", ACM Computing Surveys (CSUR) 42.4 (2010):14.
Li, Jiuyong et al., "Information based data anonymization for classification utility", Data & Knowledge Engineering, 70.12 (2011): 1030-1045.

* cited by examiner

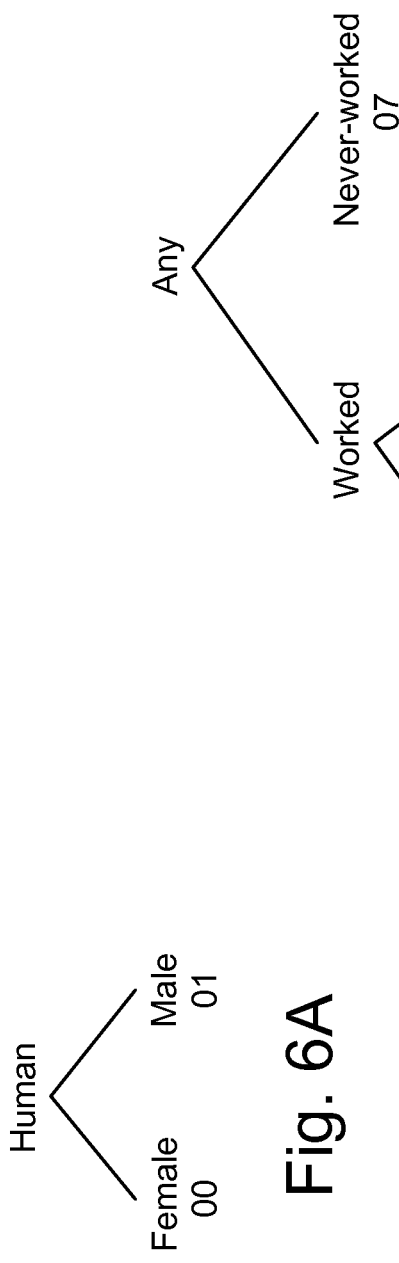
Fig. 6A
Fig. 6B

METHOD AND DEVICE FOR RISK EVALUATION

CROSS-REFERENCE TO RELATED APPLICATIONS

This is a division of U.S. application Ser. No. 13/728,684, filed on Dec. 27, 2012, which claimed Priority under 35 U.S.C. §119(a) on Patent Application No(s). 101150619 filed in Taiwan, R.O.C. on Dec. 27, 2012, the entire contents of which are hereby incorporated by reference.

TECHNICAL FIELD

The disclosure relates to a method and a device for generating an anonymous dataset, and a method and a device for risk evaluation.

BACKGROUND

With the development of data digitalization, the privacy protection of digital data begins to attract a lot of attention, especially sensitive personal information of personal lifestyle, e.g. habit, interest or occupation, as well as personal medical and health care information such as medical history or medication information. Such sensitive personal information can be easily re-identified, so that personal rights and interests will be seriously affected once the information is re-identified or leaked out.

In the past, in order to solve the problem of privacy protection of digital data, the random modification of data, the adding of fake data, the data perturbation or the data suppression have been used for generating anonymous data. However, in such conventional methods, the authenticity and creditability of the digital data are reduced because the data is modified randomly or fake data is added; or, the digital data is excessively distorted because a part of the digital data is modified and deleted not according to the authentic data. Therefore, usability and privacy of data cannot be achieved at the same time through the conventional methods.

After the anonymous data is generated, the digital data administrator may want to perform a risk evaluation for the re-identification of the anonymous data. In conventional risk evaluation method, all pieces of the original data are used for performing the re-identification. However, such risk evaluation method is very inefficient because of the long and needless evaluating computation for the repetitions of the original data.

SUMMARY

The disclosure relates to an anonymous dataset generation method, which includes following steps. A critical attribute set and a quasi-identifier (QID) set are acquired. The critical attribute set includes at least one critical attribute, the quasi-identifier set includes a plurality of quasi-identifiers, and one of the at least one critical attribute is set as an anchor attribute. An equivalence table is generated according to the quasi-identifier set, the critical attribute set and an original dataset. The equivalence table includes a plurality of equivalence classes, each of the equivalence classes includes at least one equivalence data, and each of the equivalence data includes a plurality of original values respectively corresponding to the quasi-identifiers. A plurality of data clusters of a cluster table (CT) is generated sequentially according to the equivalence table, and each of the data clusters includes at least one equivalence class. Content of the cluster table is generalized for generating and outputting an anonymous dataset corresponding to the original dataset. The original values corresponding to the anchor attribute are maintained originally in the anonymous dataset.

The disclosure relates to an anonymous dataset generation device, which includes a memory and a processor. The memory is used for storing data or storing data temporarily. The processor is coupled to the memory. The processor comprises an equivalence generation module, a cluster generation module and a data generalization module.

The equivalence generation module is used for performing following steps. A critical attribute set and a quasi-identifier set are acquired. The critical attribute set includes at least one critical attribute, the quasi-identifier set includes a plurality of quasi-identifiers, and one of the at least one critical attribute is set as an anchor attribute. An equivalence table is generated according to the quasi-identifier set, the critical attribute set and an original dataset. The equivalence table includes a plurality of equivalence classes, each of the equivalence classes includes at least one equivalence data, and each of the at least one equivalence data includes a plurality of original values respectively corresponding to the quasi-identifiers.

The cluster generation module is used for generating a plurality of data clusters of a cluster table sequentially according to the equivalence table. Each of the data clusters includes at least one of the equivalence classes. The data generalization module is used for generalizing the content of the cluster table to generate and output an anonymous dataset corresponding to the original dataset. The original values corresponding to the anchor attribute are maintained originally in the anonymous dataset.

The disclosure relates to a risk evaluation method for evaluating an anonymous dataset generated according to an original dataset, which includes following steps. A plurality of appearing times respectively corresponding to a plurality of original values of the original dataset is acquired. A partition set and a weight table are generated according to a sample parameter, an anonymous parameter and the appearing times. The original dataset is divided into a plurality of data partitions according to the partition set. A penetration dataset is generated according to the weight table and the data partitions. The penetration dataset includes a plurality of sample data. Each of the sample data compares with a plurality of anonymous data of the anonymous dataset for obtaining a plurality of matching quantities respectively corresponding to the plurality of sample data. A risk evaluation result is calculated and outputted according to the matching quantities.

The disclosure relates to a risk evaluation device used for evaluating an anonymous dataset generated according to an original dataset. The risk evaluation device includes a memory and a processor. The memory is used for storing data or storing data temporarily. The processor is coupled to the memory. The processor includes a weight generation module, a sample generation module and a risk evaluation module.

The weight generation module is used for acquiring a plurality of appearing times respectively corresponding to a plurality of original values of the original dataset, and for generating a partition set and a weight table according to a sample parameter, an anonymous parameter and the appearing times. The sample generation module is used for dividing the original dataset into a plurality of data partitions according to the partition set, and for generating a penetration dataset according to the weight table and the data partitions. The penetration dataset includes a plurality of sample data. The risk evaluation module is used for comparing each sample data with a plurality of anonymous data of the anonymous dataset to obtain a plurality of matching quantities respectively corresponding to the plurality of sample data, and for calculating and outputting a risk evaluation result according to the matching quantities.

BRIEF DESCRIPTION OF THE DRAWINGS

The present disclosure will become more fully understood from the detailed description given herein below for illustration only and thus does not limit the present disclosure, wherein:

FIG. 6A is a schematic diagram of a taxonomy tree according to an embodiment of the disclosure;

FIG. 6B is a schematic diagram of a taxonomy tree according to an embodiment of the disclosure;

DETAILED DESCRIPTION

Figure 1A:
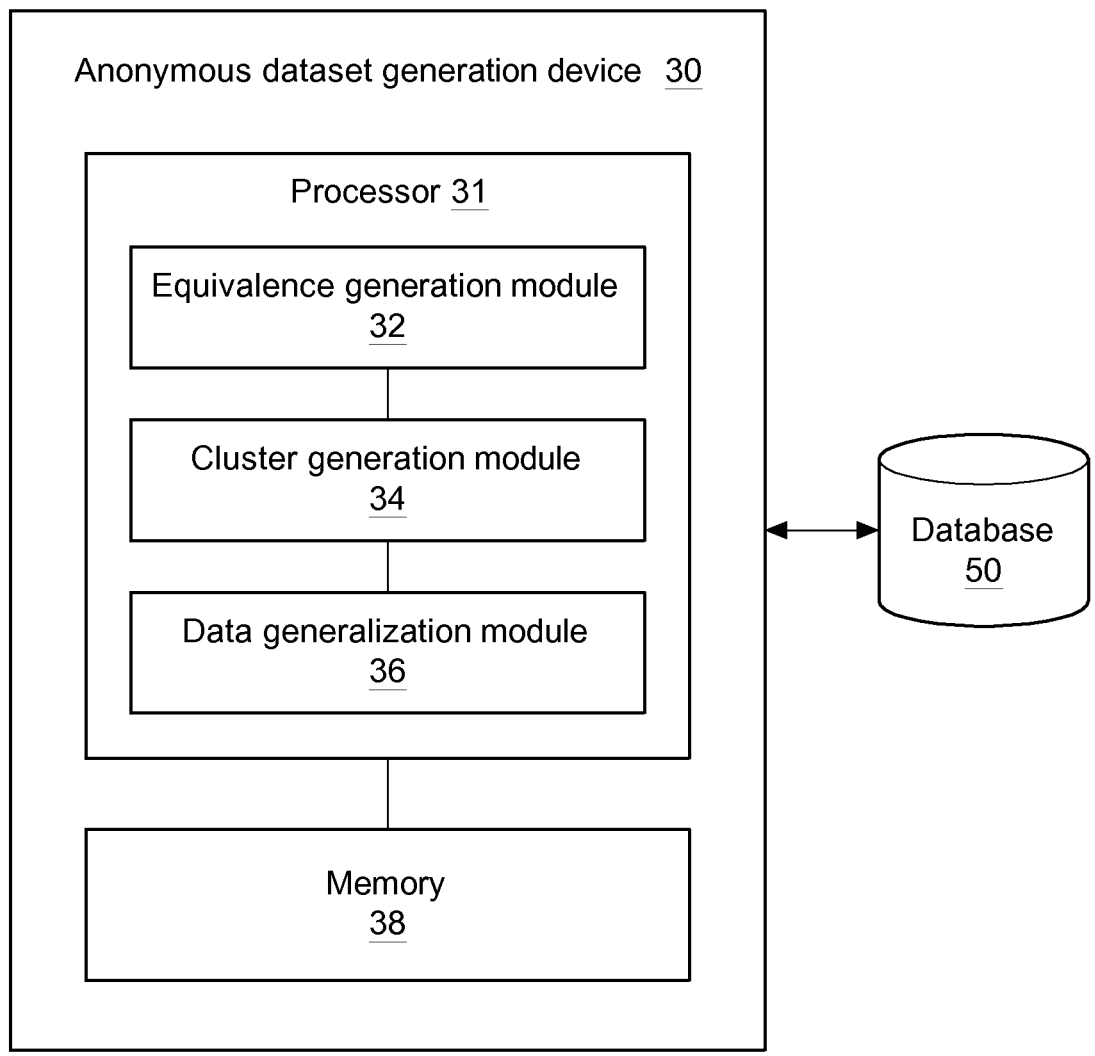
FIG. 1A is a block diagram of an anonymous dataset generation device according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An anonymous dataset generation method and device and a risk evaluation method and device of the anonymous dataset are provided by the disclosure. The anonymous dataset generation device is used for performing the anonymous dataset generation method. The risk evaluation device is used for performing the risk evaluation method.

FIG. 1A is a block diagram of an anonymous dataset generation device according to an embodiment of the disclosure. An anonymous dataset generation device 30 includes a processor 31 and a memory 38. The memory 38 is used for storing data or storing data temporarily. The processor 31 comprises an equivalence generation module 32, a cluster generation module 34 and a data generalization module 36. The processor 31 can perform each step of the anonymous dataset generation method to generate an anonymous dataset according to an original dataset. The original dataset, the anonymous dataset, an equivalence table, which is required for generating the anonymous dataset, and a cluster table can be a data table stored or stored temporarily in the memory 38 or in a database 50 of a computer.

Figure 2:
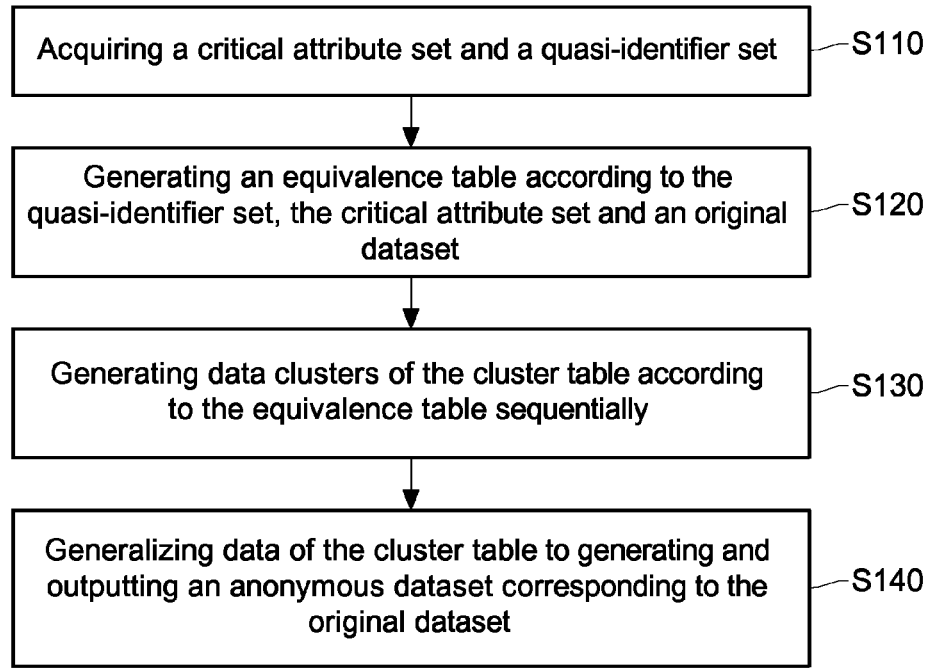
FIG. 2 is a flow chart of an anonymous dataset generation method according to an embodiment of the disclosure.

FIG. 2 is a flow chart of the anonymous dataset generation method according to an embodiment of the disclosure. The anonymous dataset generation method can de-identify the original dataset and generate the anonymous dataset conformed to a k-anonymity privacy protection limitation. K is a positive integer.

Firstly, the equivalence generation module 32 acquires a critical attribute set and a quasi-identifier (QID) set (step S110). The critical attribute set includes at least one critical attribute, and the quasi-identifier set includes a plurality of quasi-identifiers. The critical attribute set can be a subset of the quasi-identifier set. One of the at least one critical attribute or one of the quasi-identifiers is set as an anchor attribute. Then, the equivalence generation module 32 generates an equivalence table according to the quasi-identifier set, the critical attribute set and the original dataset (step S120).

The equivalence table includes a plurality of equivalence classes. Each of the equivalence classes includes at least one equivalence data, and each equivalence data includes a plurality of original values respectively corresponding to the quasi-identifiers. The critical attribute can be set according to various usages of a user who desires to use the original dataset. It indicates that the data related to the critical attributes should be maintained as much as possible in order to ensure the correctness when the data is used subsequently. The quasi-identifiers can be set by an administrator of the original dataset. It indicates that the data related to the quasi-identifiers is sensitive data.

The cluster generation module 34 generates a plurality of data clusters of the cluster table according to the equivalence table sequentially (step S130). Each of the data clusters includes at least one of the equivalence classes. Then, the data generalization module 36 performs data generalization on the cluster table for generating and outputting the anonymous dataset corresponding to the original dataset (step S140). The original values corresponding to the anchor attribute are maintained originally in the anonymous dataset.

The most important one of the at least one critical attribute is set as the anchor attribute. In the de-identification, the data related to the anchor attribute is not changed. Therefore, in the anonymous dataset, the original values corresponding to the anchor attribute are maintained originally in order to prevent the anonymous dataset from the excessive distortion caused by the de-identification. The detail of the method in FIG. 2 is described as below.

Figure 1B:
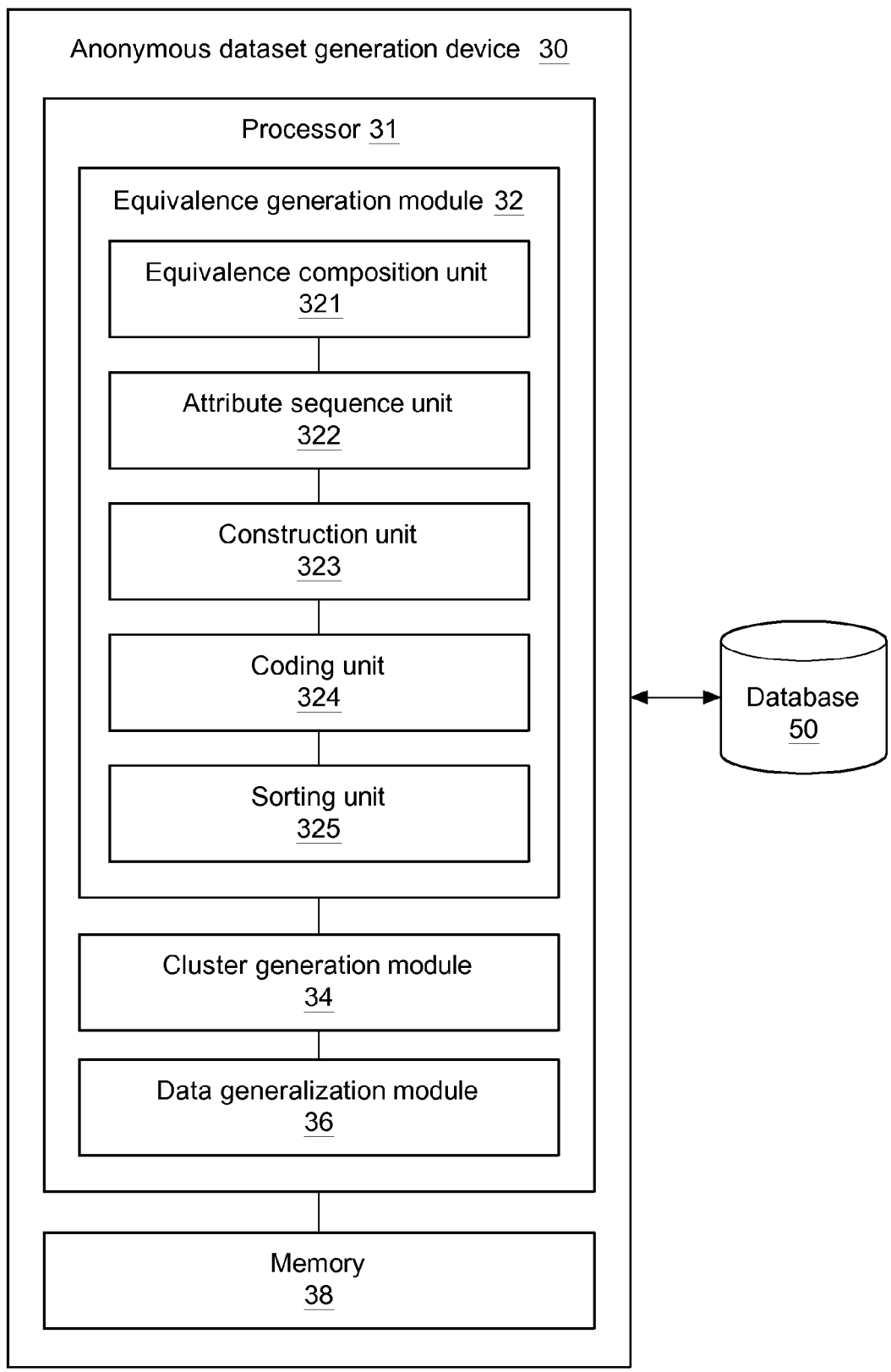
FIG. 1B is a block diagram of the anonymous dataset generation device according to an embodiment of the disclosure.

Refer to FIG. 1B, it is a block diagram of the anonymous dataset generation device according to an embodiment of the disclosure. The equivalence generation module 32 can include an equivalence composition unit 321, an attribute sequence unit 322, a construction unit 323, a coding unit 324 and a sorting unit 325, and be used for perform the steps S110 and S120.

Figure 3:
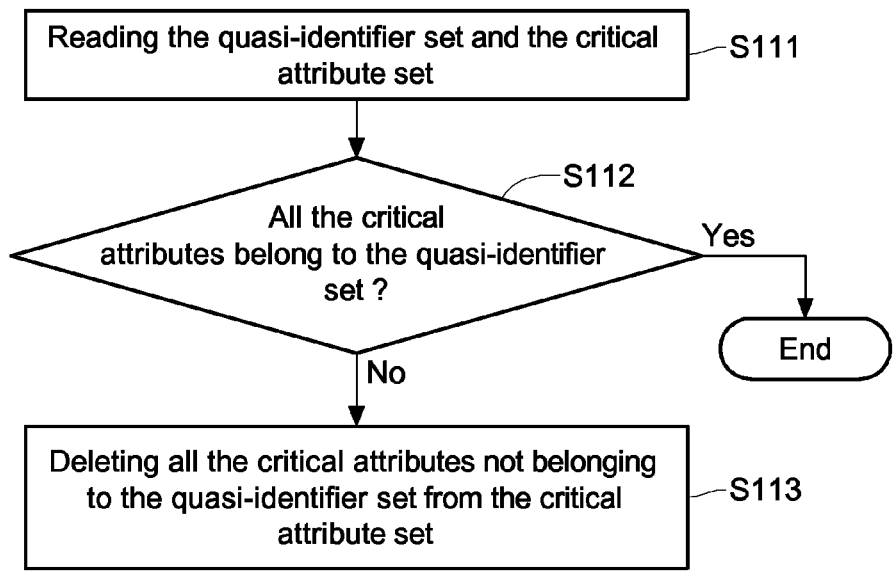
FIG. 3 is a flow chart of step S110 according to an embodiment of the disclosure.

Please refer to FIG. 3, it is a flow chart of the step S110 according to an embodiment of the disclosure. The equivalence composition unit 321 of the equivalence generation module 32 reads the quasi-identifier set and the critical attribute set from a configuration file or a user interface (UI) (step S111). The critical attribute set can be a subset of the quasi-identifier set. According to an embodiment, the anonymous dataset generation device 30 provides a graphical user interface (GUI) for a user to set the critical attribute set through the GUI, or for an administrator to set the quasi-identifier set through the GUI. The critical attribute set or the quasi-identifier set, set by the user or the administrator, can be automatically stored in the configuration file by the GUI.

After reading the quasi-identifier set and the critical attribute set, the equivalence composition unit 321 determines whether all of the at least one critical attribute belong to the quasi-identifier set (step S112). In other words, the equivalence composition unit 321 determines whether the quasi-identifier set includes the critical attribute set, or determines whether any of the quasi-identifiers in the quasi-identifier set is the same as the critical attribute.

If any one of the at least one critical attribute does not belong to the quasi-identifier set, the equivalence composition unit 321 deletes the critical attribute, which do not belong to the quasi-identifier set, from the critical attribute set (step S113). Therefore, each critical attribute set by the user belongs to the quasi-identifier set. The quasi-identifier set includes the quasi-identifiers used as the critical attributes, and other quasi-identifiers.

According to an embodiment, the original dataset has three data attributes, namely a direct identifier, a sensitive attribute and a quasi-identifier. The direct identifier indicates a single original value used for directly identifying an original attribute of a specific person. The direct identifier is, for examples, an identity card number, an employee number or a person name. The definition of the sensitive attribute is related to the usage intention. Generally, the sensitive attribute is related to personal privacy. The quasi-identifier indicates a data attribute which neither belongs to the direct identifier nor sensitive attribute. The quasi-identifier set is set by the administrator according to various usage intentions. Various usage intentions require different sensitive attributes. For example, in the regional revenue analysis, the personal medical history is sensitive data.

In other words, the quasi-identifier is what is non-sensitive, does not leak out personal privacy, and is confirmed by the administrator. By performing the step S113, the sensitive data attribute can be prevented from being leaked out when a user sets the sensitive data attribute as the critical attribute carelessly or intentionally.

Figure 4:
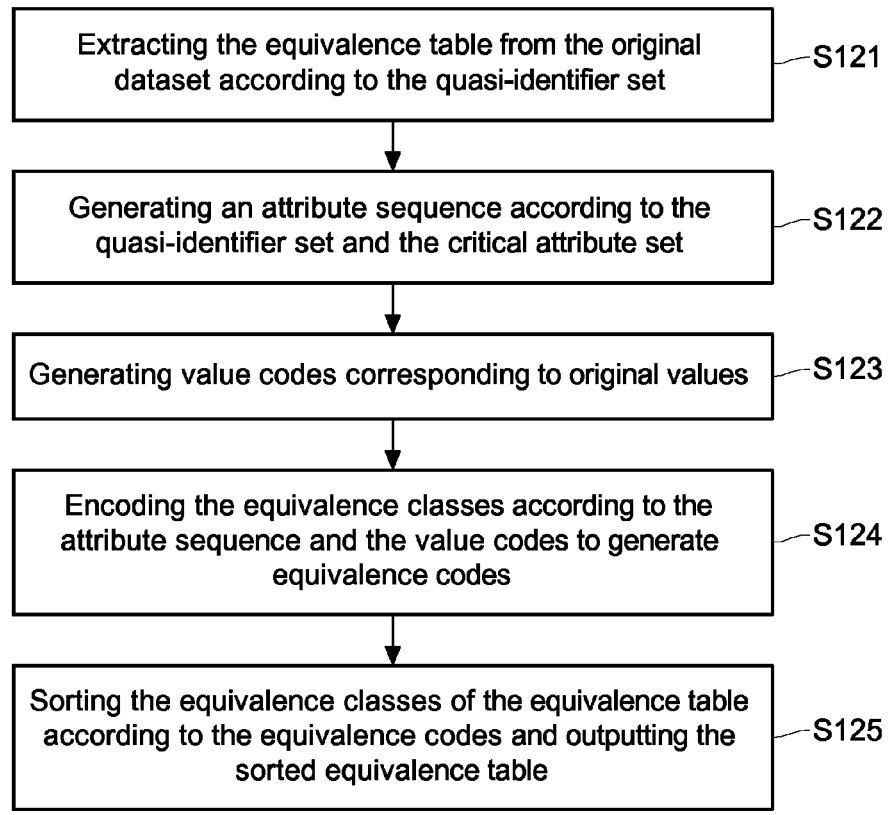
FIG. 4 is a flow chart of step S120 according to an embodiment of the disclosure.

FIG. 4 is a flow chart of the step S120 according to an embodiment of the disclosure. The equivalence composition unit 321 extracts the equivalence table from the original dataset according to the quasi-identifier set, and each of the equivalence classes includes a corresponding quantity of the equivalence data (step S121). The original dataset includes a plurality of original data. Each original data includes a plurality of original values respectively corresponding to the original attributes, and the quasi-identifiers are a part of the original attributes. The equivalence composition unit 321 can find out the original values in all of the plurality of original data corresponding to the quasi-identifier set.

The equivalence composition unit 321 determines whether any original attribute is a direct identifier. The equivalence composition unit 321 determines which original attribute is the direct identifier, and does not add the direct identifier and the corresponding original attribute to the equivalence table. According to an embodiment, if one quasi-identifier or one critical attribute is a direct identifier, the direct identifier is deleted from the quasi-identifier set and the critical attribute set.

Assume that an American adult data is stored in the original dataset, and an example of the original dataset is shown in Table 1 as below.

TABLE 1

| Work class | Sex | Data number | Age |
|---|---|---|---|
| Private | Male | 96509 | 23 |
| State-government | Male | 335005 | 51 |
| . | | | |
| . | | | |
| . | | | |
| Non-enterprise employee | Female | 243768 | 40 |
| Enterprise employee | Female | 151910 | 33 |
| Private | Male | 150683 | 43 |
| Local-government | Female | 89813 | 29 |
| Private | Male | 150234 | 43 |

The four original attributes in the original dataset in Table 1 are "work class", "sex", "data number" and "age". The data number is a direct identifier or a sensitive attribute but not a quasi-identifier. Assume that the critical attribute is "sex" and the quasi-identifiers are "work class", "sex" and "age", then the equivalence composition unit 321 can obtain the original values corresponding to "work class", "sex" and "age", in the original dataset.

According to the arrangement of the original values of each original data, the equivalence composition unit 321 can provide various equivalence classes. All the original values corresponding to the same quasi-identifier are grouped into the same equivalence class. For example, the two original data respectively having the data numbers "150683" and "150234" have the same original values corresponding to the quasi-identifiers, i.e. "private", "male" and "43", so that the original values are grouped into the same equivalence class. This equivalence class includes at least these two equivalence data.

After all the equivalence classes are formed by the equivalence composition unit 321 according to the original values, all the equivalence classes are stored as an equivalence table. Then, the equivalence composition unit 321 computes a quantity of the original data corresponding to each of the equivalence classes to obtain corresponding quantities, and the corresponding quantities are stored in the equivalence table.

The attribute sequence unit 322 generates an attribute sequence according to the quasi-identifier set and the critical attribute set (step S122). The attribute sequence unit 322 employs an attribute sequence rule to sort all the quasi-identifiers in order to generate the attribute sequence. The attribute sequence rule includes a first rule, a second rule, a third rule and a fourth rule described below. After sorting the quasi-identifiers, the critical attribute or the quasi-identifier, having the highest priority, are set as the anchor attribute.

According to an embodiment, the critical attribute set can be an empty set. In other words, the user does not have to specify the critical attribute. If none of the critical attribute is specified, the attribute sequence unit 322 sorts all the quasi-identifiers according to the attribute sequence rule, and sets the first quasi-identifier in the attribute sequence as the anchor attribute.

The first rule requires that the priority of the critical attribute is higher than the priority of the quasi-identifier not belonging to the critical attributes. The second rule requires that the priority of the quasi-identifier belonging to a categorical type attribute is higher than the priority of the quasi-identifier belonging to a numeric type attribute. If the original value corresponding to the quasi-identifier is numeral, the quasi-identifier belongs to the numeric type attribute. If the original value corresponding to the quasi-identifier is a character or a string, the quasi-identifier belongs to the categorical type attribute.

The third rule requires that the priority of the quasi-identifier corresponding to a shorter height of a taxonomy tree is higher than the priority of the quasi-identifier corresponding to a taller height of the taxonomy tree. Each of the quasi-identifiers of the categorical type attribute corresponds to an independent taxonomy tree. In general, the more complicated the original value, the higher the height of the taxonomy tree is. The fourth rule requires that the priority of the quasi-identifier corresponding to a lower original value variance is higher than the priority of the quasi-identifier corresponding to a higher original value variance. The original value variance is a number of types of the original values corresponding to the quasi-identifier. For example, the original values corresponding to "sex" are "male" and "female", so that the original value variance is two.

For example, "sex" is the critical attribute, so that its priority is higher than the priorities of "work class" and "age" in the attribute sequence. Because "work class" belongs to the categorical type attribute and "age" belongs to the numeric type attribute, the priority of "work class" is higher than the priority of "age" in the attribute sequence. Accordingly, the outputted attribute sequence is "sex, work class and age", and the anchor attribute is "sex".

According to each of the original values of each of the quasi-identifiers, the construction unit 323 generates a plurality of value codes corresponding to the original values (step S123). The detail of the step S123 is described as follows.

Figure 5:
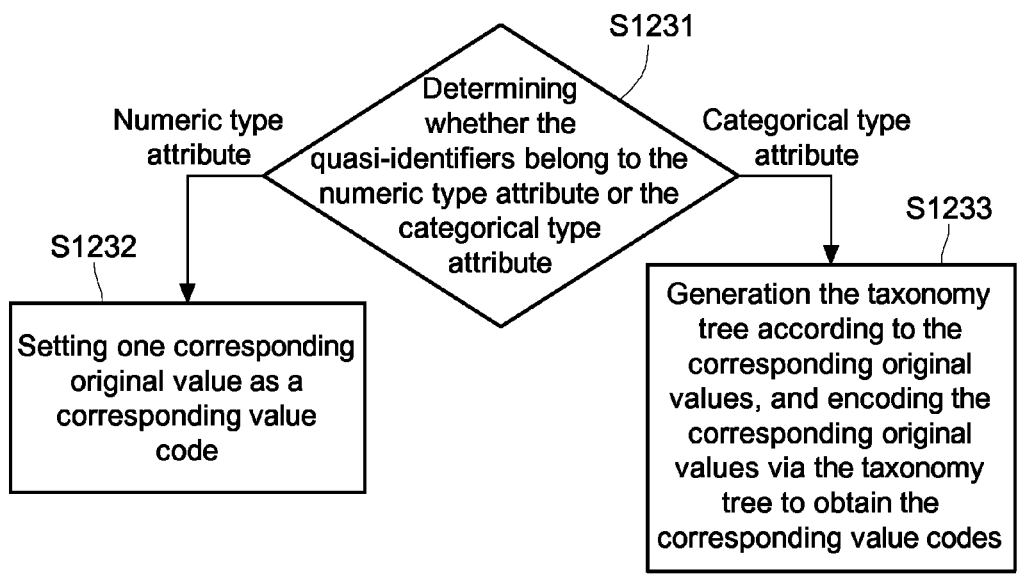
FIG. 5 is a flow chart of step S123 according to an embodiment of the disclosure.

FIG. 5 is a flow chart of the step S123 according to an embodiment of the disclosure. Firstly, the construction unit 323 determines whether the quasi-identifiers belong to the numeric type attribute or the categorical type attribute (step S1231). For the quasi-identifiers of the numeric type attribute, the corresponding original values can be directly set as the corresponding value codes (step S1232). For example, each of the original values corresponding to "age" can be directly set as the value code. Therefore, the value code corresponding to the original value of "43" is 43.

For the quasi-identifiers of the categorical type attribute, the construction unit 323 generates the taxonomy tree according to the corresponding original values, and encodes the corresponding original values via the taxonomy tree in order to obtain the corresponding value codes (step S1233). The detail of the taxonomy tree is described as follows.

FIGS. 6A and 6B illustrate the taxonomy trees corresponding to the quasi-identifiers of "sex" and "work class" respectively. Leaf nodes of the taxonomy trees are all the possible original values corresponding to the quasi-identifier. For example, the original values corresponding to "sex" are "male" and "female", the original values corresponding to "work class" are "private", "non-enterprise employee", "enterprise employee", "federal-government", "local-government", "state-government", "no-pay" and "never-worked".

The construction unit 323 generates the value codes for all the leaf nodes sequentially. For example, double-bit decimal numbers are generated from "00". Moreover, each of the value codes of the taxonomy tree is reset. As shown in FIGS. 6A and 6B, the value codes corresponding to the original values "female" and "male" are "00" and "01" respectively, and the value codes corresponding to the original values "private", "non-enterprise employee", "enterprise employee", "federal-government", "local-government", "state-government", "no-pay" and "never-worked" are "00" to "07" respectively. According to an embodiment, the structure of the taxonomy tree can be setup manually and predeterminedly and stored in the configuration file. The construction unit 323 can read the required taxonomy tree from the configuration file and number the taxonomy tree.

After generating the value codes according to each of the original values of the quasi-identifiers, the coding unit 324 encodes the equivalence classes according to the attribute sequence and the value codes for generating a plurality of equivalence codes (step S124). The coding unit 324 reads the equivalence classes one by one, sorts the value codes of the original values corresponding to the read equivalence class according to the attribute sequence, and then obtains the equivalence code. For example, the equivalence codes of the equivalence classes of "male", "private" and "43" are combined to form a decimal number "010043" composed of "01", "00" and "43".

After all the equivalence codes are generated, the sorting unit 325 sorts the equivalence classes of the equivalence table according to the equivalence codes, and outputs the sorted equivalence table (step S125). The sorting unit 325 can sort the equivalence codes from the smallest one to the largest one, so that the equivalence classes corresponding to the similar original values are adjacent to each other. Thus, the readability of the equivalence table and the rate of generating the anonymous dataset according to the equivalence table subsequently may be enhanced.

An example of the generated equivalence table is shown in Table 2 below.

TABLE 2

| Equivalence code | Sex | Work class | Age | Corresponding quantity |
| --- | --- | --- | --- | --- |
| 000140 | Female | Non-enterprise Employee | 40 | 1 |
| 000233 | Female | Enterprise Employee | 33 | 2 |
| 000429 | Female | Local-government | 29 | 3 |
| 010023 | Male | Private | 23 | 2 |
| 010043 | Male | Private | 43 | 5 |
| 010351 | Male | Federal-government | 51 | 1 |
| 010551 | Male | State-government | 51 | 1 |

In this way, the equivalence generation module 32 automatically generates the equivalence table according to the critical attribute set defined by the user. Then, the cluster generation module 34 generates the cluster table according to the equivalence table. The equivalence table includes a plurality of the data clusters, and each of the data clusters includes a cluster code and at least one of the equivalence classes.

In order to ensure the generated anonymous dataset is conformed to the k-anonymity privacy protection limitation, the anonymous dataset generation device 30 employs an anonymous parameter k to perform its verification when the anonymous dataset is generated. The anonymous dataset includes a plurality of anonymous data, and each of the anonymous data includes a plurality of third attribute values respectively corresponding to the quasi-identifiers. K-anonymity means that there are k or more than k pieces of anonymous data corresponding to the same third attribute value, in the anonymous dataset. The higher the value of k, the higher the degree of de-identification is. The anonymous parameter can be set by the user or the administrator through the GUI, and can be read from the configuration file.

Figure 7:
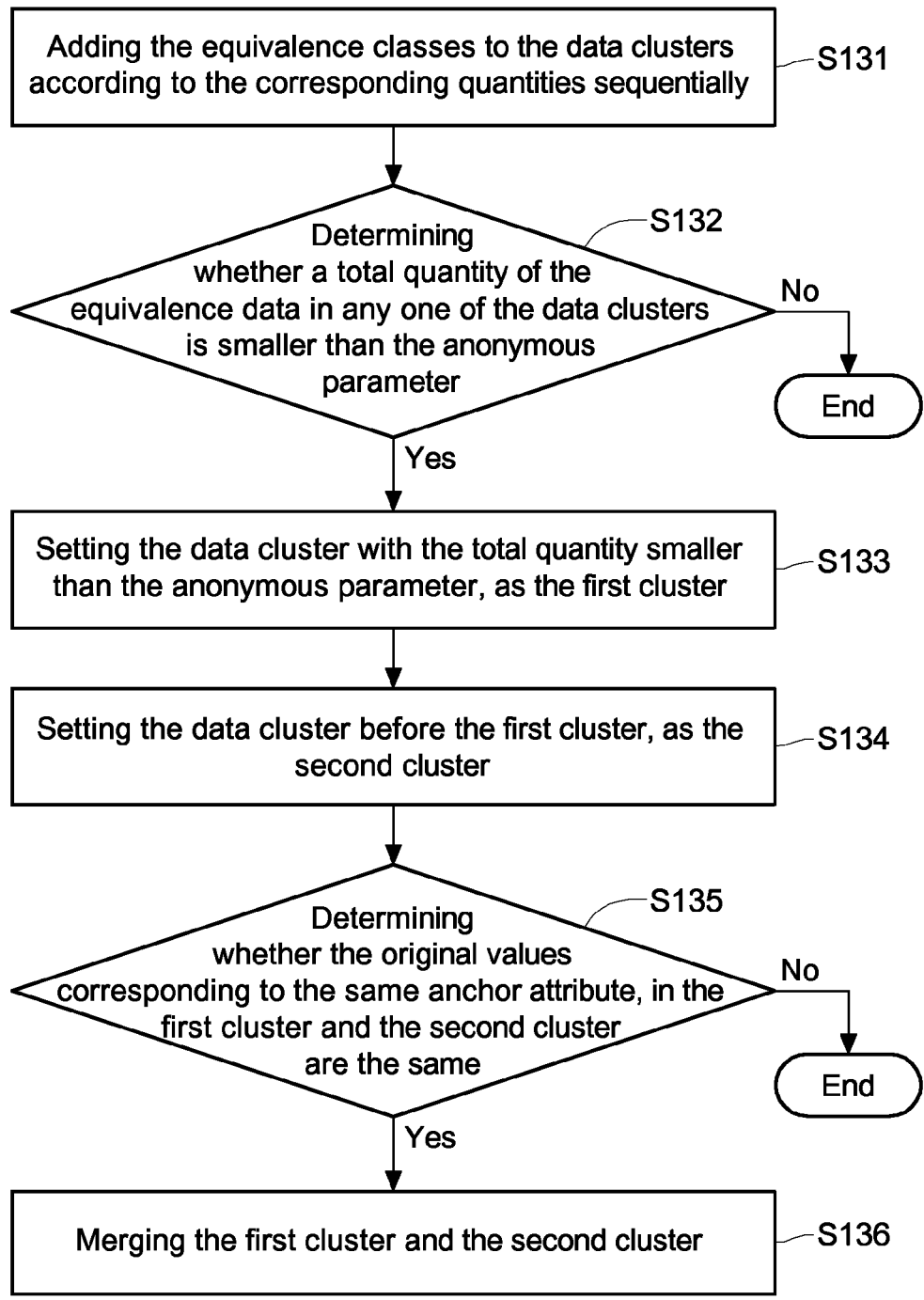
FIG. 7 is a flow chart of step S130 according to an embodiment of the disclosure.

FIG. 7 is a flow chart of the step S130 according to an embodiment of the disclosure. Firstly, the cluster generation module 34 adds the equivalence classes to the data clusters according to the corresponding quantities sequentially (step S131), and then determines whether a total quantity of the equivalence data in any one of the data clusters is smaller than the anonymous parameter (step S132).

When a total quantity of the equivalence data in any one of the data clusters is smaller than the anonymous parameter, the cluster generation module 34 can set this data cluster corresponding to the total quantity smaller than the anonymous parameter, to be a first cluster (step S133), and set a previous data cluster, which is before the first cluster, as a second cluster (step S134). Assume that the data clusters in the cluster table are sorted from the smallest one to the largest one according to the cluster codes, then the first cluster and the second cluster are the two consecutive data clusters in the cluster table, and the cluster code of the first cluster is smaller than the cluster code of the second cluster.

The cluster generation module 34 determines whether the original values corresponding to the anchor attribute, in the first cluster and the second cluster are the same (step S135). When the original values corresponding to the anchor attribute, in the first cluster and the second cluster are the same, the first cluster and the second cluster are merged (step S136), so that the quantity of the equivalence classes in the merged data cluster is bigger than the anonymous parameter.

More specifically, in order to embody the k-anonymity privacy protection limitation, the cluster generation module 34 also makes sure that there are k or more than k pieces of the equivalence data in each of the generated data clusters as much as possible in the step S131.

Figure 8:
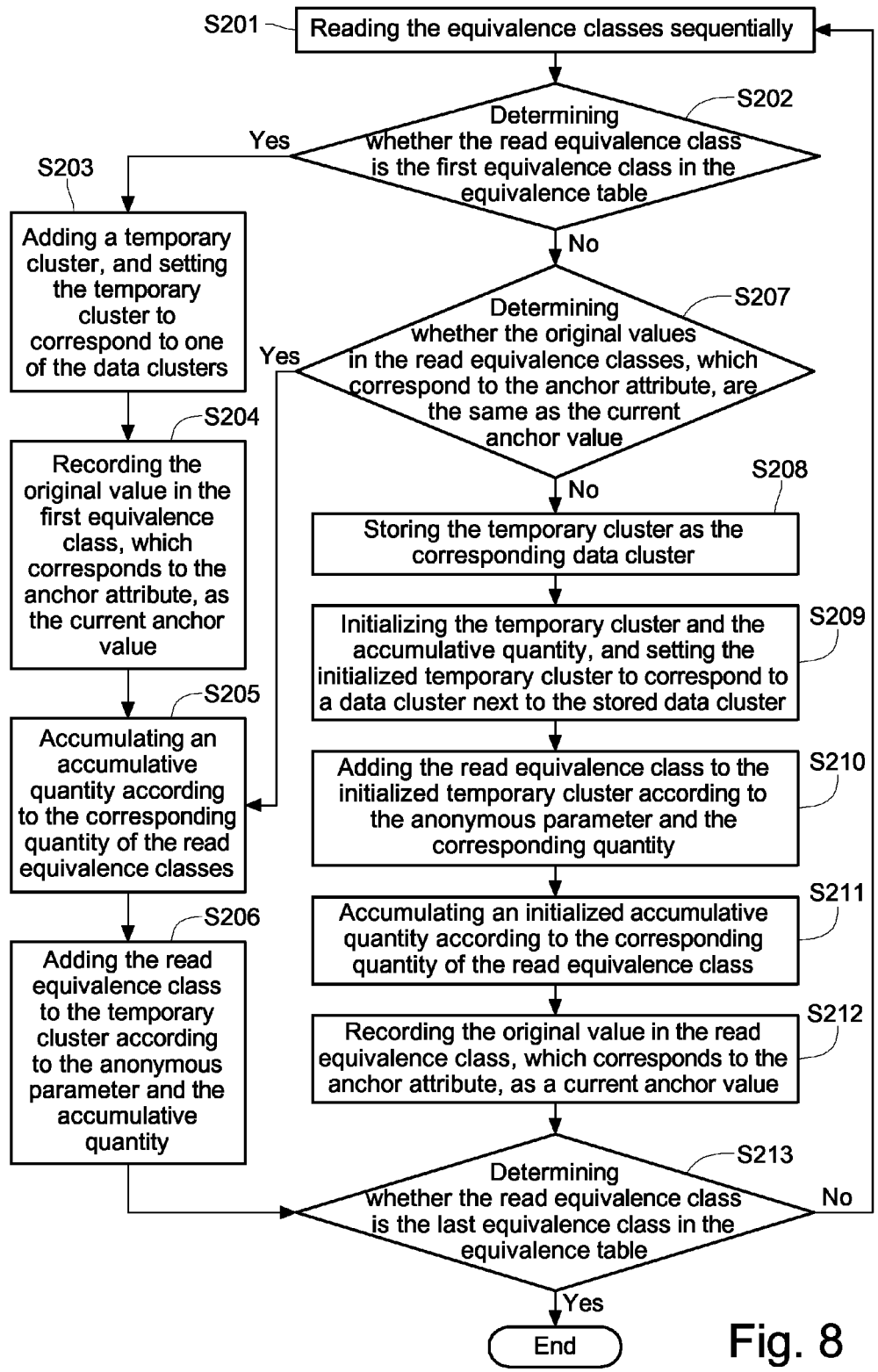
FIG. 8 is a flow chart of step S131 according to an embodiment of the disclosure.

FIG. 8 is a flow chart of the step S131 according to an embodiment of the disclosure. The cluster generation module 34 reads all the equivalence classes sequentially (step S201) in order to add all the equivalence data to the cluster table sequentially.

The cluster generation module 34 determines whether the read equivalence class is the first equivalence class in the equivalence table (step S202). If yes, steps S203 to S206 are performed; otherwise, step S207 to S212 are performed.

The cluster generation module 34 can add a temporary cluster and set the temporary cluster to correspond to one of the data clusters (step S203). More specifically, if the read equivalence class is the first equivalence class in the equivalence table, it indicates that none of the data clusters is generated herein. Therefore, when the quantity of the equivalence data in the temporary cluster is bigger than or equal to the anonymous parameter, the temporary cluster can be stored as the first data cluster. Assume that the cluster code of the first data cluster equals 1; then the temporary cluster can be set to correspond to the data cluster with the cluster code equaled to 1 in the step S203. According to this principle, the cluster generation module 34 can generate the data clusters one by one.

The cluster generation module 34 records the original value corresponding to the anchor attribute, in the first equivalence class to be a current anchor value (step S204). Take Table 2 as an example, the original value "female" corresponding to the anchor attribute "sex" is recorded as the current anchor value. Then, the cluster generation module 34 accumulates an accumulative quantity according to the corresponding quantity of the read equivalence classes (step S205), and adds the read equivalence classes to the temporary cluster according to the anonymous parameter and the accumulative quantity (step S206).

Assume that the original value of the accumulative quantity is 0, in the step S205, a sum of the current accumulative quantity and the corresponding quantity of the read equivalence classes can be set as an updated accumulative quantity. In an example of the first equivalence class with the equivalence code "000140" in Table 2, the corresponding quantity is 1, and the accumulative quantity is 1 (0+1=1).

On the other hand, when the read equivalence class is not the first equivalence class in the equivalence table, the cluster generation module 34 can further determine whether the original values corresponding to the anchor attribute, in the read equivalence class are the same as the recorded current anchor value (step S207). If the original values corresponding to the anchor attribute, in the read equivalence classes are the same as the current anchor value, the steps S205 and S206 can also be performed for adding the read equivalence class to the temporary cluster.

For example, when the read equivalence class is the second equivalence class (the equivalence class with the equivalence code "000233") in Table 2, and when the original value corresponding to the anchor attribute "sex," in the second equivalence class is "female," the original value "female" of the second equivalence class is the same as the current anchor value "female". Thus, the steps S205 and S206 can be performed on the second equivalence class. According to an embodiment, the current anchor value records the corresponding value code. The cluster generation module 34 can directly compare the recorded value code with the value code corresponding to the anchor attribute, i.e. compare the recorded value code with the first two numerals of the read equivalence code. The detail of the step S206 is described as follows.

Figure 9:
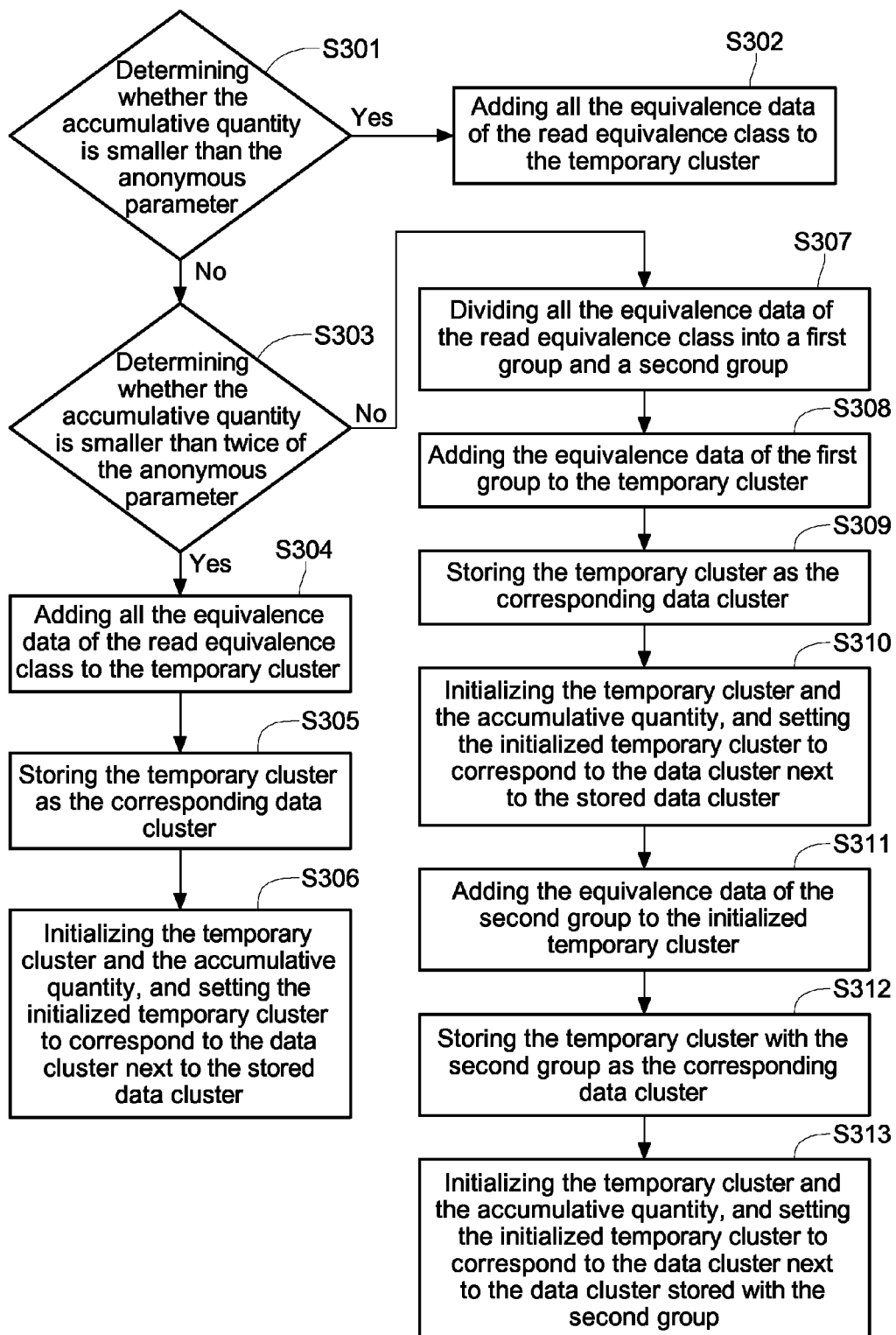
FIG. 9 is a flow chart of step S206 according to an embodiment of the disclosure.

FIG. 9 is a flow chart of the step S206 according to an embodiment of the disclosure. The cluster generation module 34 determines whether the accumulative quantity is smaller than the anonymous parameter (step S301). When the accumulative quantity is smaller than the anonymous parameter, the cluster generation module 34 adds all the equivalence data of the read equivalence class to the temporary cluster (step S302), and then reads a next equivalence class. Assume that the anonymous parameter is 3, and that the accumulative quantity accumulated according to the currently read equivalence class (the first equivalence class) is 1. It indicates that even though all the equivalence data of the currently read equivalence class are added to the temporary cluster, the corresponding accumulative quantity does not achieve the number k of the k-anonymity yet. Thus, all the equivalence data of the currently read equivalence class can be added to the temporary cluster.

However, the content of the anonymous data will be distorted excessively if too many equivalence classes are merged. Thus, when the accumulative quantity is not smaller than the anonymous parameter, the cluster generation module 34 further determines whether the accumulative quantity is smaller than twice of the anonymous parameter (step S303). As a result, the accumulative quantity may not become far bigger than the k-anonymity after the equivalence classes are added to the temporary cluster, which has not achieved the number k of the k-anonymity yet.

When the accumulative quantity is equal to the anonymous parameter, or when the accumulative quantity is bigger than the anonymous parameter and is smaller than twice of the anonymous parameter, the cluster generation module 34 can add all the equivalence data of the read equivalence class to the temporary cluster (step S304), and store the temporary cluster as the corresponding data cluster (step S305). Herein, even though all the equivalence data of the currently read equivalence class are added to the temporary cluster, the accumulative quantity is not far bigger than the anonymous parameter.

After the temporary cluster is stored as the corresponding data cluster, the temporary cluster and the accumulative quantity can be initialized, and the initialized temporary cluster is set to correspond to a next data cluster after the stored data cluster (step S306). For example, when the original temporary cluster corresponds to the data cluster with the cluster code of 1, the cluster generation module 34 can set the initialized temporary cluster to correspond to the data cluster with the cluster code of 2. Thus, the temporary cluster is emptied after the initialization, and the original value of the accumulative quantity is set as 0.

Take the second equivalence class (the equivalence class with the equivalence code 000233) in Table 2 as an example, the corresponding quantity is 2 and the accumulative quantity is 3 (1+2=3=k). Because the accumulative quantity equals to the anonymous parameter, all the equivalence data of the second equivalence class can be added to the temporary cluster, and the temporary cluster including the equivalence data of the first and the second equivalence classes can be stored as the data cluster with the cluster code 1. Then, the cluster generation module 34 initializes the temporary cluster and the accumulative quantity, sets the initialized temporary cluster to correspond to the cluster code 2, and then reads a next equivalence class.

When the accumulative quantity is bigger than or equal to twice of the anonymous parameter, the cluster generation module 34 performs steps S307 to S313 in order to add all the equivalence data of the currently read equivalence class to the cluster table properly.

The cluster generation module 34 divides all the equivalence data of the currently read equivalence class into a first group and a second group (step S307). The first group includes at least one of the equivalence data, and the second group includes the remaining equivalence data in the read equivalence class. A quantity of the equivalence data in the second group is equal to or bigger than the anonymous parameter.

According to an embodiment, a quantity of the equivalence data in the first group equals to the anonymous parameter minus the accumulative quantity before the accumulation. Take the fifth equivalence class (the equivalence class with the equivalence code 010043) in Table 2 as an example, the accumulative quantity before the accumulation is 2, the cluster code corresponding to the temporary cluster is 3, the corresponding quantity of the read equivalence class is 5. Therefore, the accumulative quantity after the accumulation is 7. Herein, the top one (3−2=1) equivalence data can be extracted from the read equivalence class for being set as the first group, and the remaining four (5−1=4) equivalence data can be set as the second group.

The cluster generation module 34 can add the equivalence data of the first group to the temporary cluster (step S308), and then store the temporary cluster as the corresponding data cluster (step S309). Subsequently, the temporary cluster and the accumulative quantity can be initialized, and the initialized temporary cluster can be set to correspond to a next data cluster after the stored data cluster (step S310).

Then, the cluster generation module 34 adds the equivalence data of the second group to the initialized temporary cluster (step S311). Because the quantity of the equivalence data of the second group is equal to or bigger than the anonymous parameter, after the equivalence data of the second group are added to the initialized temporary cluster, the temporary cluster with the second group can be directly stored as the corresponding data cluster (step S312). Similarly, after storing the data cluster, the cluster generation module 34 can initialize the temporary cluster and the accumulative quantity, and then set the initialized temporary cluster to correspond to a next data cluster after the data cluster with the second group (step S313).

For example, after the temporary cluster is stored as the data cluster with the cluster code 3, the temporary cluster and the accumulative quantity are initialized, and then the initialized temporary cluster is set to correspond to the cluster code 4. Subsequently, the five pieces of equivalence data of the second group are added to the temporary cluster corresponding to the cluster code 4, and the temporary cluster is directly stored as the data cluster with the cluster code 4. Further, the temporary cluster and the accumulative quantity are initialized again, and the initialized temporary cluster is set to correspond to the cluster code 5.

In other words, if the accumulative quantity is far bigger than the anonymous parameter after the equivalence class is added to the current temporary cluster, the cluster generation module 34 can divide this equivalence class and store the divided equivalence class as a plurality of corresponding data clusters.

According to an embodiment, if the quantity of the equivalence data in the second group is bigger than twice of the anonymous parameter, the quantity of the equivalence data in the second group will be maintained, and no additional division of the equivalence classes will be performed.

Moreover, the accumulative quantity can be recorded in the cluster table when each of the equivalence classes is added to the temporary cluster. The accumulative quantity herein is the total quantity of the equivalence data in the temporary cluster after the equivalence classes are added to the temporary cluster. For example, the total quantity is 1 (0+1=1) when the first equivalence class in Table 2 is added to the temporary cluster, and the total quantity is 3 (1+2=3) when the second equivalence class in Table 2 is added to the temporary cluster.

By performing the steps S301 to S313 mentioned above, the cluster generation module 34 can generate the corresponding data clusters according to the read equivalence classes, and the generated data clusters are conformed to the k-anonymity privacy protection limitation.

Refer to FIG. 8, when the read equivalence class is not the first equivalence class, and when the original value corresponding to the anchor attribute, in the read equivalence class is different from the current anchor value, steps S208 to S213 can be performed. For example, when the read equivalence class is the fourth equivalence class (the equivalence class with the equivalence code 010023) in Table 2, and the original value corresponding to the anchor attribute "Sex," in the fifth equivalence class is "Male," which is different from the current anchor value of "Female". Thus, the steps S208 to S213 can be performed for the fifth equivalence class.

If the original value corresponding to the anchor attribute, in the currently read equivalence class is different from the current anchor value, it indicates that the content of the currently read equivalence class is very different from the content of the previous equivalence class. Therefore, these two equivalence classes are not added to the same data cluster. The cluster generation module 34 can store the temporary cluster as the corresponding data cluster (step S208), initialize the temporary cluster and the accumulative quantity, and set the initialized temporary cluster to correspond to a next data cluster after the stored data cluster (step S209). The cluster generation module 34 can further add the read equivalence class to the initialized temporary cluster according to the anonymous parameter and the corresponding quantity (step S210).

The cluster generation module 34 adds the currently read equivalence class and the previous equivalence class to the different data clusters respectively, for preventing the original value corresponding to the anchor attribute, from being modified when the data generalization is performed subsequently. The cluster generation module 34 can perform the steps S301 to S313 to add the read equivalence class to the initialized temporary cluster, and whereby the steps S301 to S313 will not be described herein again.

Then, the cluster generation module 34 accumulates the initialized accumulative quantity according to the corresponding quantity of the read equivalence class (step S211), and records the original value corresponding to the anchor attribute, in the read equivalence class to be the current anchor value (step S212). For example, after the fourth equivalence class in Table 2 is added to the initialized temporary cluster, the accumulative quantity is updated to the corresponding quantity 2 of the fourth equivalence class, and the original value "Male" of the new anchor attribute or the value code of this original is recorded as the new current anchor value.

Whenever each of the equivalences class is processed completely, the cluster generation module 34 can determine whether the read equivalence class is the last equivalence class in the equivalence table (step S213), in order to determine whether to read a next equivalence class. By performing the steps S131 to S135, the steps S201 to S213, and the steps S301 to S313, the cluster generation module 34 can generate the cluster table according to the equivalence table sequentially.

An example of the generated cluster table is shown in Table 3 below.

TABLE 3

| Sex | Work class | Age | Cluster code | Accumulative quantity |
| --- | --- | --- | --- | --- |
| Female | Non-enterprise Employee | 40 | 1 | 1 |
| Female | Enterprise Employee | 33 | 1 | 3 |
| Female | Local-government | 29 | 2 | 3 |
| Male | Private | 23 | 3 | 2 |
| Male | Private | 43 | 3 | 3 |
| Male | Private | 43 | 4 | 4 |
| Male | Federal-government | 51 | 4 | 6 |
| Male | State-government | 51 | 4 | 6 |

Herein, the accumulative quantity in Table 3 is generated after the equivalence data is added.

After the cluster table is obtained, the data generalization module 36 generalizes the content of the cluster table to generate the anonymous dataset. The detailed operation of the data generalization module 36 is described as follows.

Figure 10:
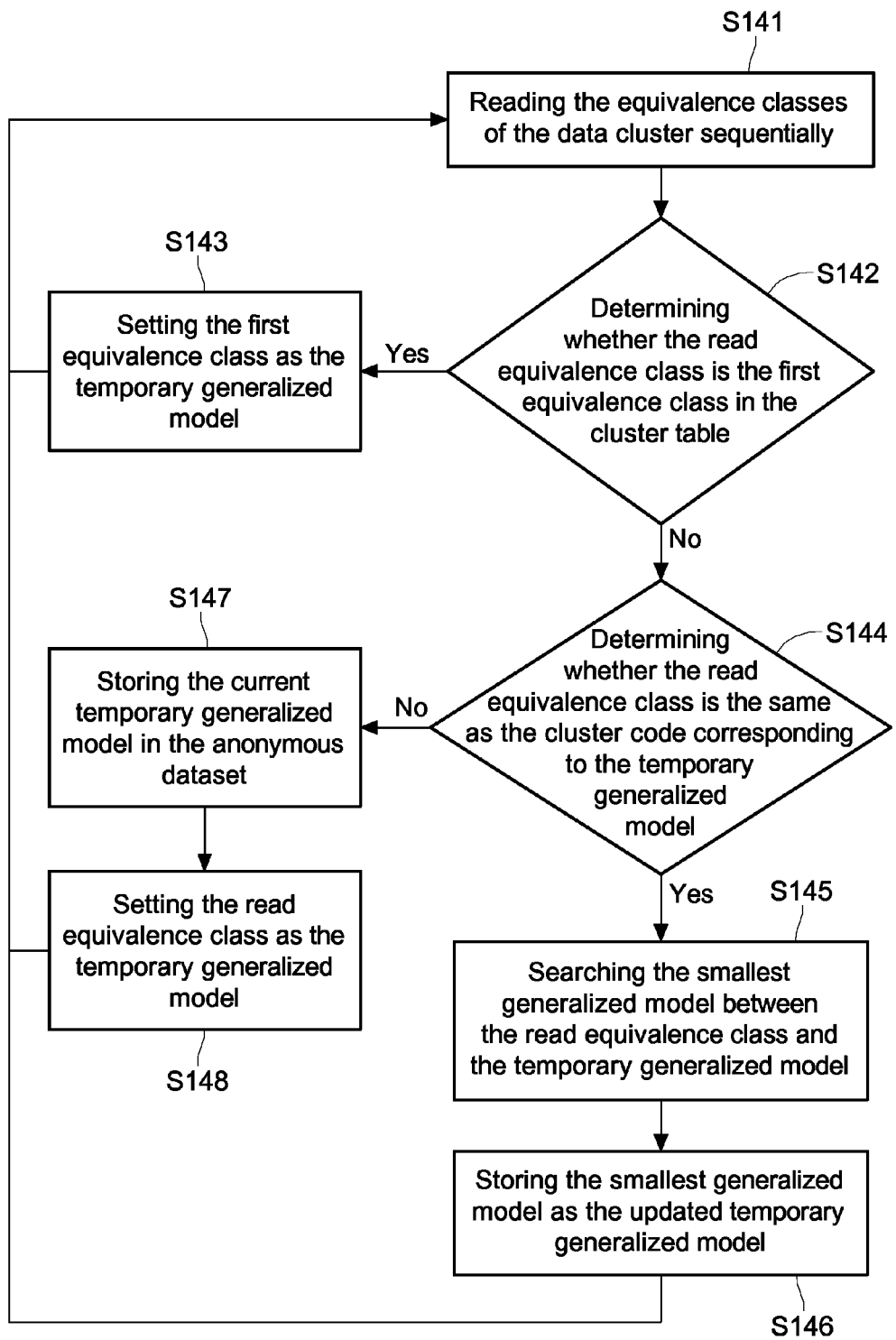
FIG. 10 is a flow chart of step S140 according to an embodiment of the disclosure.

FIG. 10 is a flow chart of the step S140 according to an embodiment of the disclosure. The data generalization module 36 reads all the equivalence classes of all the data clusters in the cluster table sequentially (step S141), and determines whether the read equivalence class is the first equivalence class in the cluster table (step S142). When the read equivalence class is the first equivalence class in the cluster table, the first equivalence class can be set as a temporary generalized model (step S143). The temporary generalized model includes a plurality of first attribute values respectively corresponding to the quasi-identifiers, and the original values of the first attribute values can be set as the original values of the first data cluster.

If the read equivalence class is not the first equivalence class in the cluster table, the data generalization module 36 further determines whether the read equivalence class is the same as the cluster code corresponding to the temporary generalized model (step S144). If the read equivalence class is the same as the cluster code corresponding to the temporary generalized model, it indicates that both the read equivalence class and the temporary generalized model belong to the same data cluster. Therefore, the data generalization module 36 can search for a smallest generalized model between the read equivalence class and the temporary generalized model (step S145), and store the smallest generalized model as an updated temporary generalized model (step S146).

The smallest generalized model can be regarded as a union set between the read equivalence class and the temporary generalized model. The smallest generalized model includes a plurality of second attribute values respectively corresponding to the quasi-identifiers, and the content of the second attribute value include both the corresponding first attribute value and the original value. The detail for searching the smallest generalized model will be described later.

On the contrary, if the read equivalence class is different from the cluster code corresponding to the temporary generalized model, it indicates that the read equivalence class and the temporary generalized model belong to the different data clusters respectively. Therefore, the data generalization module 36 can store the current temporary generalized model in the anonymous dataset (step S147), and set the read equivalence class as a new temporary generalized model (step S148).

Each of the anonymous data includes a plurality of the third attribute values respectively corresponding to the quasi-identifiers. The data generalization module 36 can store the second attribute values of the current temporary generalized model as the third attribute values of the anonymous data correspondingly. The data generalization module 36 initializes the temporary generalized model, sets the read equivalence class as a new temporary generalized model, and returns to the step S141 to read a next equivalence class.

Figure 11:
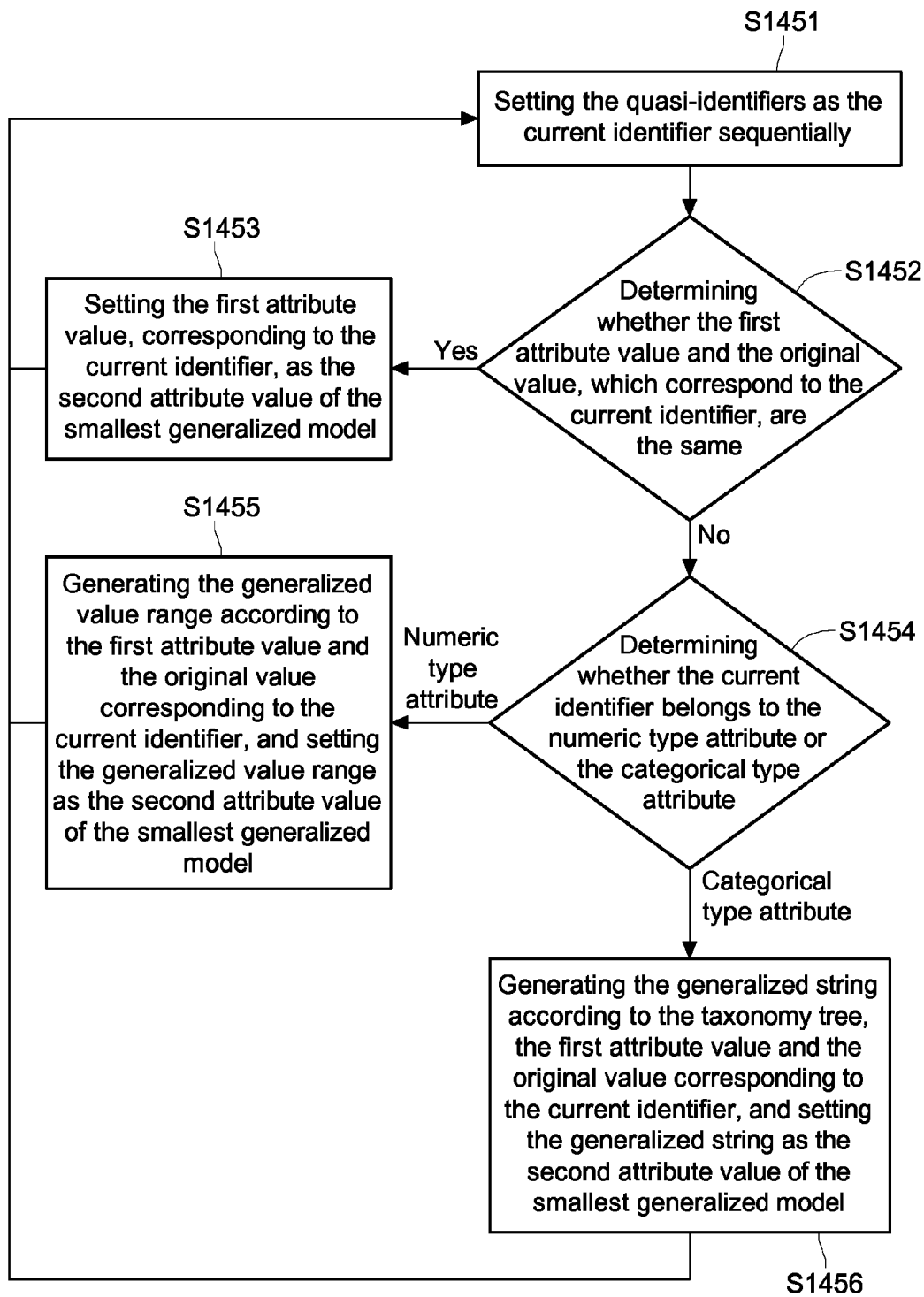
FIG. 11 is a flow chart of step S145 according to an embodiment of the disclosure.

On the other hand, the detail for searching the smallest generalized model is described as follows. FIG. 11 is a flow chart of the step S145 according to an embodiment of the disclosure. The data generalization module 36 sets all the quasi-identifiers as a current identifier sequentially (step S1451), one by one inspects the original values of the read equivalence class corresponding to the current quasi-identifier, and one by one inspects the first attribute values of the temporary generalized model corresponding to the current quasi-identifier.

The data generalization module 36 determines whether the original value of the read equivalence class and the first attribute value of the temporary generalized model, which correspond to the current identifier, are the same (step S1452). When the original value and the first attribute value are the same, the first attribute value corresponding to the current identifier can be set as the second attribute value of the smallest generalized model (step S1453), and the second attribute value is stored.

For example, the first attribute value and the original value, which correspond to the quasi-identifiers "sex" and "work class", in the fourth equivalence class "male, private, 23, 3, 2" and the fifth equivalence class "male, private, 43, 3, 3" in Table 3 are the same. The first attribute value or the original value, which are the same, can be set as the second attribute value directly.

When the first attribute value and the original value, which correspond to the current identifier, are different, the data generalization module 36 further determines whether the current identifier belongs to a numeric type attribute or a categorical type attribute (step S1454). If the current identifier belongs to the numeric type attribute, a generalized value range can be generated according to the first attribute value and the original value, which correspond to the current identifier, and the generalized value range can be set as the second attribute value of the smallest generalized model (step S1455).

For example, when the fourth equivalence class in Table 3 is processed, the data generalization module 36 sets the original value of the fourth equivalence class as the first attribute value of the temporary generalized model. When the fifth equivalence class in Table 3 is processed, the first attribute value "23" and the original value "43" of the read equivalence class, which correspond to the quasi-identifier "age", are different. Herein, the data generalization module 36 generates a smallest value range including both the first attribute value and the original value, and set the smallest value range as the generalized value range. In this example, the generalized value range of [23-43] can be generated, and set as the second attribute value, and the second attribute value is stored.

Assume that the first attribute value is a value range, and that the original value is in this value range. The data generalization module 36 sets the first attribute value as the generalized value range directly, and sets the generalized value range as the second attribute value. For example, when the first attribute value is [23-43] and the corresponding original value is "23", the second attribute value is the same as the first attribute value.

If the current identifier belongs to the categorical type attribute, the data generalization module 36 generates a generalized string according to the taxonomy tree, the first attribute value and the original value, which correspond to the current identifier, and then sets the generalized string as the second attribute value of the smallest generalized model (step S1456). Similarly, the data generalization module 36 can generate a string having a meaning capable of covering both the first attribute value and the original value, and can set this string as the generalized string. Briefly, the generalized string can be found according to the correlation of the nodes corresponding to the first attribute value and the original value, in the taxonomy tree.

If the node corresponding to the first attribute value, in the taxonomy tree is not a leaf node, and the leaf node corresponding to the original value belongs to a sub-tree based on the node (set as a root node) corresponding to the first attribute value, the data generalization module 36 can set the first attribute value as the generalized string directly. For example, after the seventh equivalence class "male, federal-government, 51, 4, 6" in Table 3 is processed, the first attribute value corresponding to the quasi-identifier work class, in the temporary generalized model is "pay". Moreover, the corresponding original value in the eighth equivalence class "male, state-government, 51, 4, 6" in Table 3 is "state-government". In the taxonomy tree shown in FIG. 6B, the leaf node corresponding to "state-government" belongs to the sub-tree based on the root node corresponding to "pay". Therefore, "state-government" belongs to "pay", i.e. "pay" covers "state-government", and "pay" can be set as the second attribute value.

If the node corresponding to the first attribute value, in the taxonomy tree is a leaf node, or if the node corresponding to the original value does not belong to the sub-tree based on the root node corresponding to the first attribute value, the data generalization module 36 can set a value corresponding to the node (i.e. a lowest common parent node) corresponding to the first attribute value and the original value, to be a generalized string. In other words, a smallest sub-tree based on the node corresponding to the first attribute value and the original value is found, and then the value corresponding to the root node of the smallest sub-tree is set as the second attribute value.

For example, after the data generalization module 36 processes the first equivalence class "female, non-enterprise employee, 40, 1, 1" in Table 3, the first attribute value of the temporary generalized model corresponding to the quasi-identifier "work class", is "non-enterprise employee". Moreover, the corresponding original value in the second equivalence class "female, enterprise employee, 33, 1, 3" in Table 3 is "enterprise employee." In the taxonomy tree shown in FIG. 6B, the parent node of "non-enterprise employee" and of "enterprise employee" are "employee," so that "employee" can be set as the second attribute value.

For another example, after the data generalization module 36 processes the sixth equivalence class "male, private, 43, 4, 4" in Table 3, the first attribute value of the temporary generalized model corresponding to the quasi-identifier "work class" is "private", and the corresponding original value in the seventh equivalence class is "federal-government". The value "pay" corresponding to the root node of the smallest sub-tree including the node corresponding to both the first attribute value and the original value is set as the second attribute value.

Furthermore, in step S147, when the current temporary generalized model is stored in the anonymous dataset, the data generalization module 36 calculates a total quantity of the equivalence data in the anonymous data according to the accumulative quantity of each cluster data, and stores the total quantity in the anonymous dataset.

An example of the anonymous dataset including the total quantity of equivalence data in anonymous data is shown in Table 4 below.

TABLE 4

| Sex | Work class | Age | Total quantity |
| --- | --- | --- | --- |
| Female | Employee | [33-40] | 3 |
| Female | Local-government | 29 | 3 |
| Male | Private | [23-43] | 3 |
| Male | Pay | [43-51] | 6 |

As a conclusion according to the anonymous dataset generation device and the anonymous dataset generation method in the disclosure, the critical attributes can be set by users according to the usage intentions, and the equivalence table can be generated according to the critical attributes and the original dataset. Then, the cluster table conformed to the k-anonymity privacy protection limitation can be generated according to the equivalence classes, and the equivalence classes corresponding to the same cluster code, in the cluster table are generalization partially for generating the anonymous dataset.

The generated anonymous dataset can be conformed to the k-anonymity privacy protection limitation, so that the de-identification may be enough to protect the original data. Because the original values corresponding to the critical attributes are maintained, the data with higher authenticity can be maintained in the anonymous dataset. Furthermore, the partial content is generalized for preventing the lost of data usability caused by the lowered authenticity.

The risk evaluation device of the anonymous dataset and the risk evaluation method of the anonymous dataset are described hereinafter. The risk evaluation device and method of the anonymous dataset can evaluate a degree of de-identification of the anonymous dataset, and find out the dangerous data which are less de-identified in the anonymous dataset. Briefly, a plurality of sample data can be generated according to the original dataset, and the sample data are used for attacking the anonymous dataset in order to evaluate the risk of re-identification of the anonymous data.

An example of the original dataset is shown in Table 5 below.

TABLE 5

| Original data number | Sex | Age | Postcode |
|---|---|---|---|
| 1 | Male | 22 | 12111 |
| 2 | Female | 25 | 12111 |
| 3 | Female | 22 | 12123 |
| 4 | Male | 22 | 12177 |
| 5 | Female | 25 | 12189 |
| 6 | Female | 23 | 12128 |
| 7 | Male | 21 | 12111 |
| 8 | Female | 24 | 12128 |
| 9 | Female | 23 | 12123 |
| 10 | Male | 22 | 12128 |

An example of the anonymous dataset with the total quantity of anonymous data is shown in Table 6 below. The anonymous parameter used for the anonymous dataset equals 3.

TABLE 6

| Sex | Age | Postcode | Total quantity |
|---|---|---|---|
| Male | [21-22] | 121** | 4 |
| Female | [22-23] | 1212* | 3 |
| Female | [24-25] | 121** | 3 |

Figure 12:
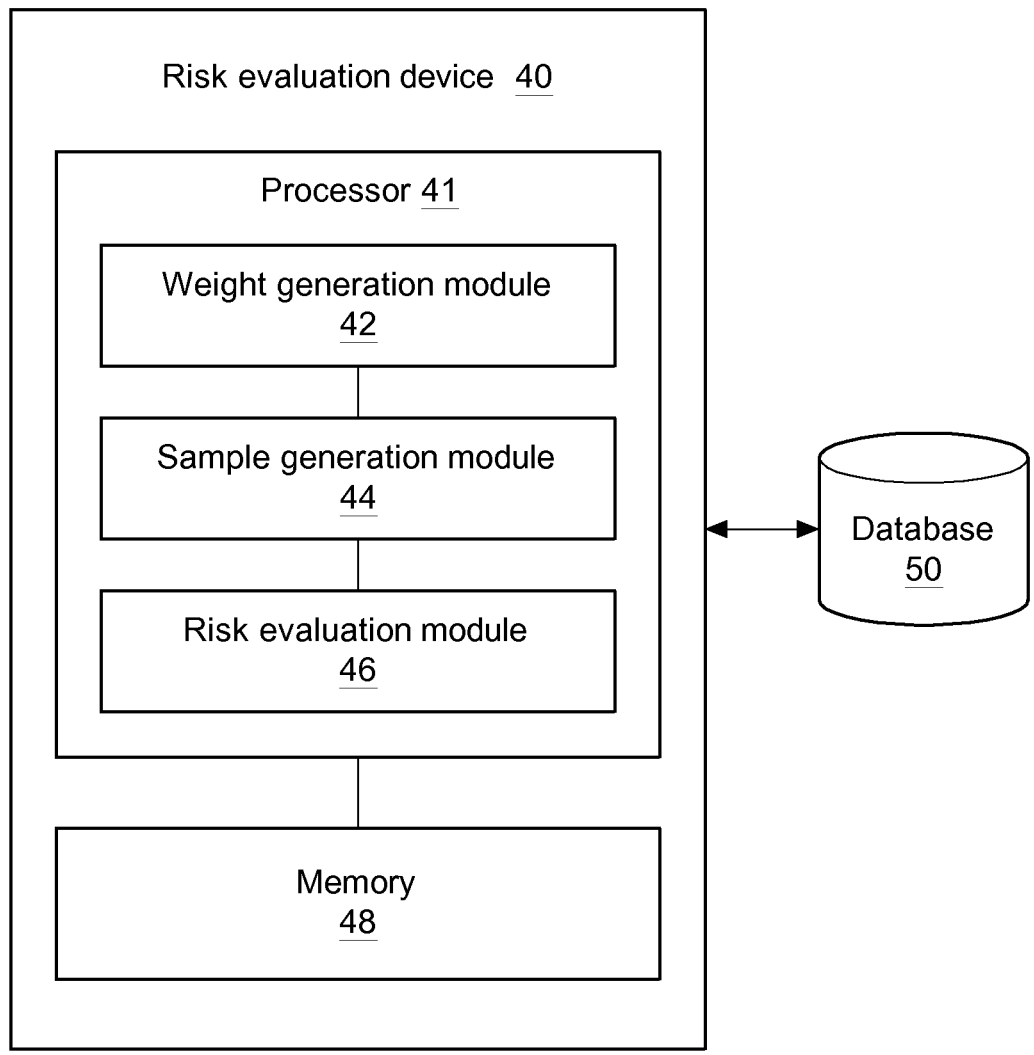
FIG. 12 is a block diagram of a risk evaluation device of the anonymous dataset according to an embodiment of the disclosure.

FIG. 12 is a block diagram of the risk evaluation device of the anonymous dataset according to an embodiment of the disclosure. A risk evaluation device 40 comprises a processor 41 and a memory 48. The memory 48 is used for storing data or storing data temporarily. The processor 41 comprises a weight generation module 42, a sample generation module 44 and a risk evaluation module 46. The processor 41 can perform each step of the risk evaluation method for evaluating the anonymous dataset generated according to the original dataset. The anonymous dataset generation device 30 and the risk evaluation device 40 can be embodied in the same processor or computer, or embodied in different processors or computers. Furthermore, the original dataset, the anonymous dataset, the weight table and the penetration dataset required for performing the risk evaluation method are stored or stored temporarily in the memory 48, or are stored or stored temporarily in the data table of the database 50 in the computer.

Figure 13:
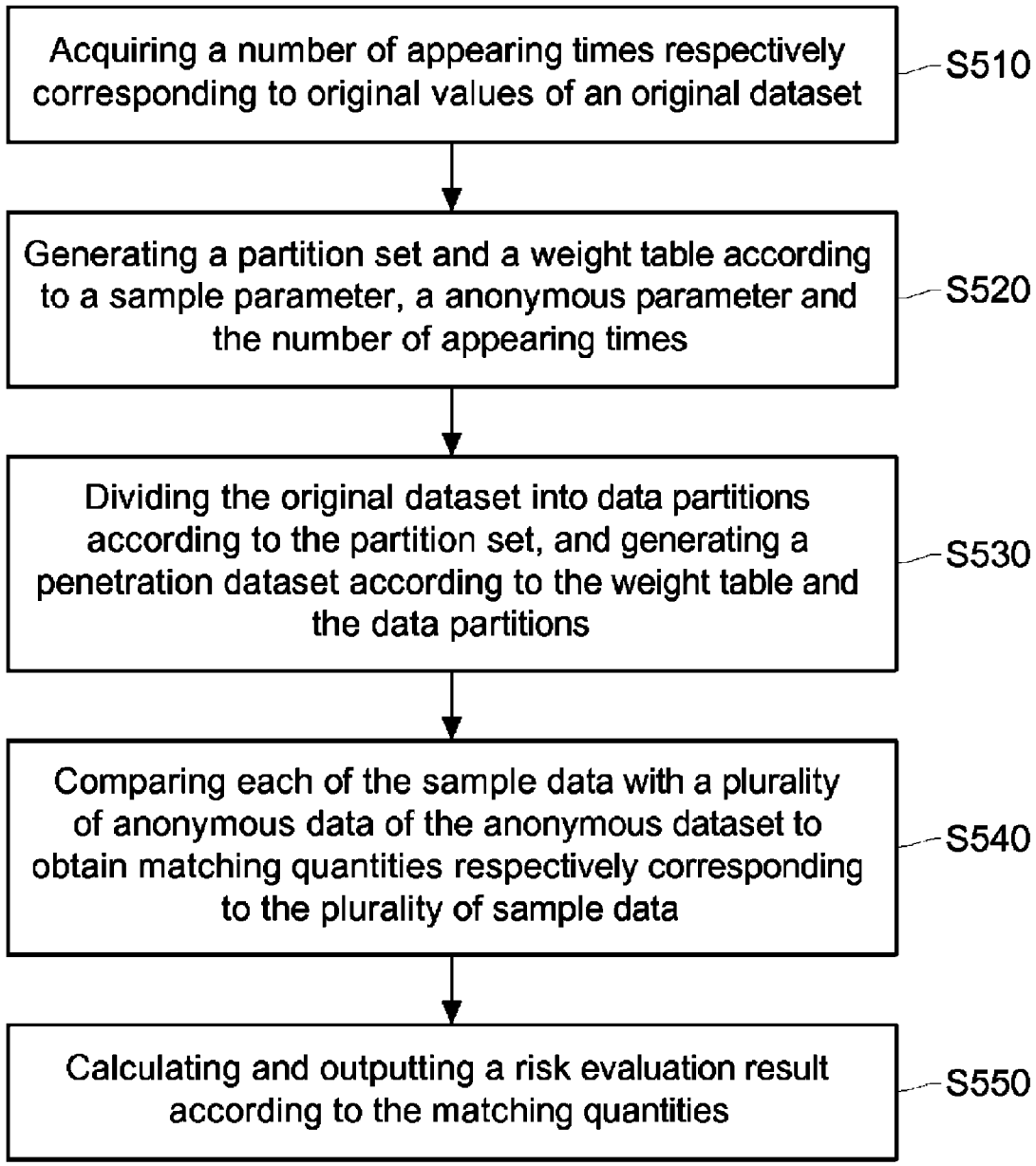
FIG. 13 is a flow chart of a risk evaluation method of the anonymous dataset according to an embodiment of the disclosure.

FIG. 13 is a flow chart of the risk evaluation method of the anonymous dataset according to an embodiment of the disclosure. Firstly, a plurality of appearing times respectively corresponding to the original values of the original dataset is acquired by the weight generation module 42 (step S510). The weight generation module 42 searches each of the original values, respectively corresponding to the quasi-identifiers, in the original dataset one by one, and sets the number of times, which the original values appear in the original dataset, as the corresponding appearing times. For example, in the original dataset, the quantity of the original data which have the original value "female" and correspond to the quasi-identifier "sex" is calculated, and the calculated quantity can be set as the appearing times corresponding to the original value "female".

The weight generation module 42 generates a partition set and a weight table according to a sample parameter, an anonymous parameter and the appearing times (step S520). The sample parameter can be set by the user, and the risk evaluation device 40 can acquire the sample parameter through the GUI. The bigger the sample parameter, the more sample data can be generated for attacking the anonymous dataset.

Figure 14:
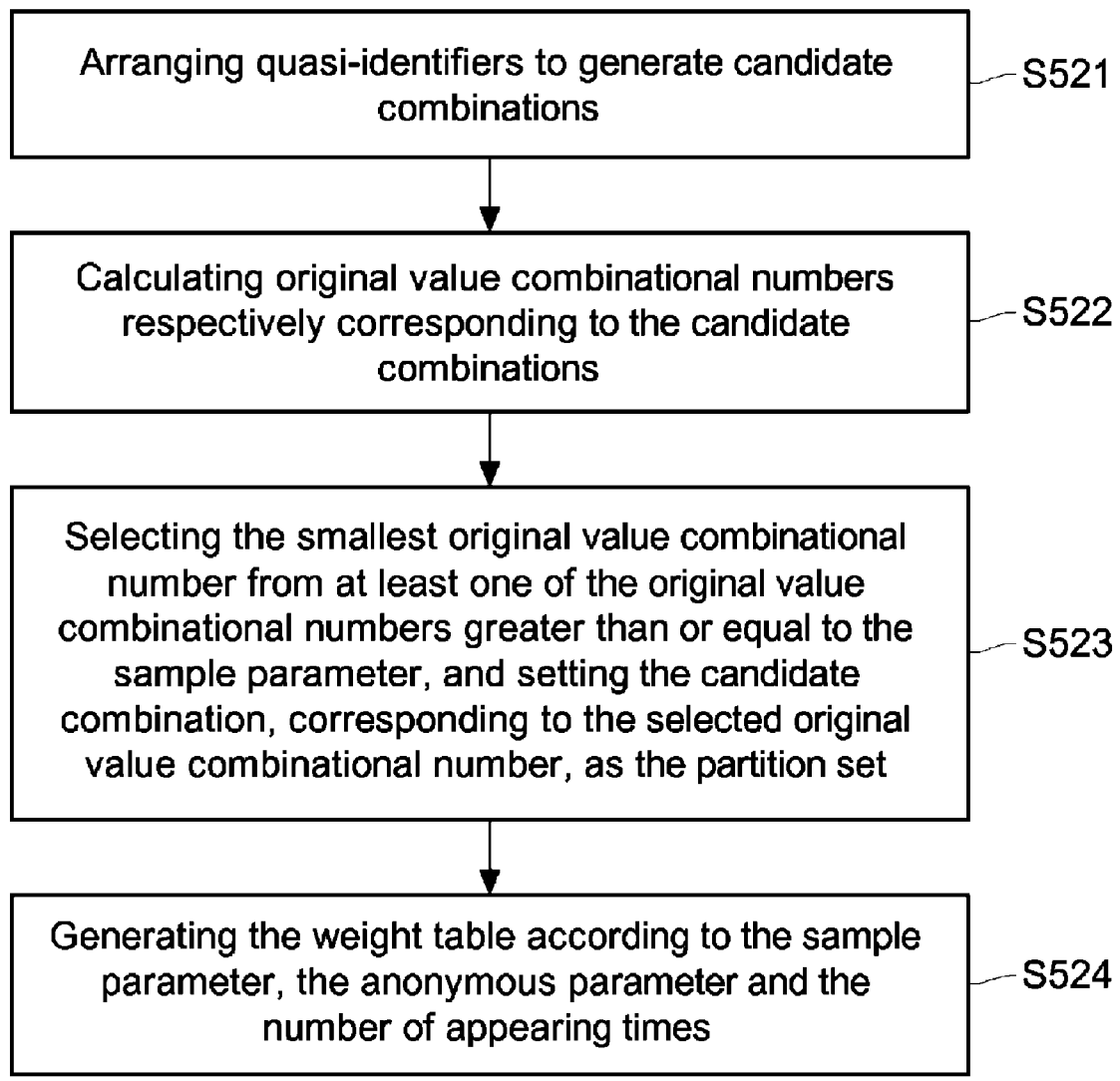
FIG. 14 is a flow chart of the step S520 according to an embodiment of the disclosure.

FIG. 14 is a flow chart of the step S520 according to an embodiment of the disclosure. The weight generation module 42 arranges and groups the quasi-identifiers for generating a plurality of candidate combinations (step S521). Each of the candidate combinations includes at least one of the quasi-identifiers. Assume that there are N quasi-identifiers. The weight generation module 42 firstly generates the candidate combinations each of which includes only one of the quasi-identifiers, i.e. the N quasi-identifiers are used for generating one of the candidate combinations respectively. Then, the weight generation module 42 generates the candidate combinations each of which includes two of the quasi-identifiers. The rest can be deduced by analogy. Therefore, the quantity of the candidate combinations can be calculated as follows.

$$C_1^N + C_2^N \ldots + C_N^N = \sum_{i=1}^{N} C_i^N$$

Assume that the quasi-identifier set is {sex, age, postcode}. Seven candidate combinations {sex}, {age}, {postcode}, {sex, age}, {sex, postcode}, {age, postcode} and {sex, age, postcode} are generated.

The weight generation module 42 calculates a plurality of original value combinational numbers respectively corresponding to the candidate combinations (step S522). The original value combinational number is a group quantity obtained by dividing the original data according to the candidate combinations.

For example, all the original data can only be divided into two groups according to the candidate combination {sex}. The two groups are the original data with the corresponding original value "female" and the original data with the corresponding original value "male" respectively. According to the candidate combination {sex, work class}, all the original data can be divided into a plurality of groups, such as the original data with the corresponding original values "female" and "non-enterprise employee", the original data with the corresponding original values "female" and "enterprise employee", or the original data with the corresponding original values "male" and "private". The original value combinational number is a quantity of the groups.

It should be noted that, a combination having original values not existing in the original dataset is not be used for calculating the original value combinational numbers. Assume that a possible quantity of the original values corresponding to one quasi-identifier is three, and that there are only two original values corresponding to the quasi-identifier, in the original dataset. The original value combinational number corresponding to the candidate combination composed of the quasi-identifier is two.

For example, in the Table 5, the original value combinational numbers corresponding to the seven candidate combinations mentioned previously are respectively 2 for {sex}, 5 for {age}, 5 for {postcode}, 6 for {sex, age}, 7 for {sex, postcode}, 10 for {age, postcode}, and 10 for {sex, age, postcode}.

In order to control the quantity of the sample data to approach the sample parameter and be not smaller than the sample parameter, the weight generation module 42 selects the smallest original value combinational number from at least one of the original value combinational number which is bigger than or equal to the sample parameter, and sets the candidate combination corresponding to the selected original value combinational number, to be a partition set (step S523). Assume the sample parameter is 6. The original value combinational number of the candidate combination {sex, age} is 6, which is equal to the sample parameter, so that the weight generation module 42 selects the candidate combination {sex, age} and sets it as the partition set.

Then, the original dataset is divided according to the partition set, and a weight table is generated according to the sample parameter, the anonymous parameter and the appearing times (step S524). The detail of the step S524 is described as follows.

Figure 15:
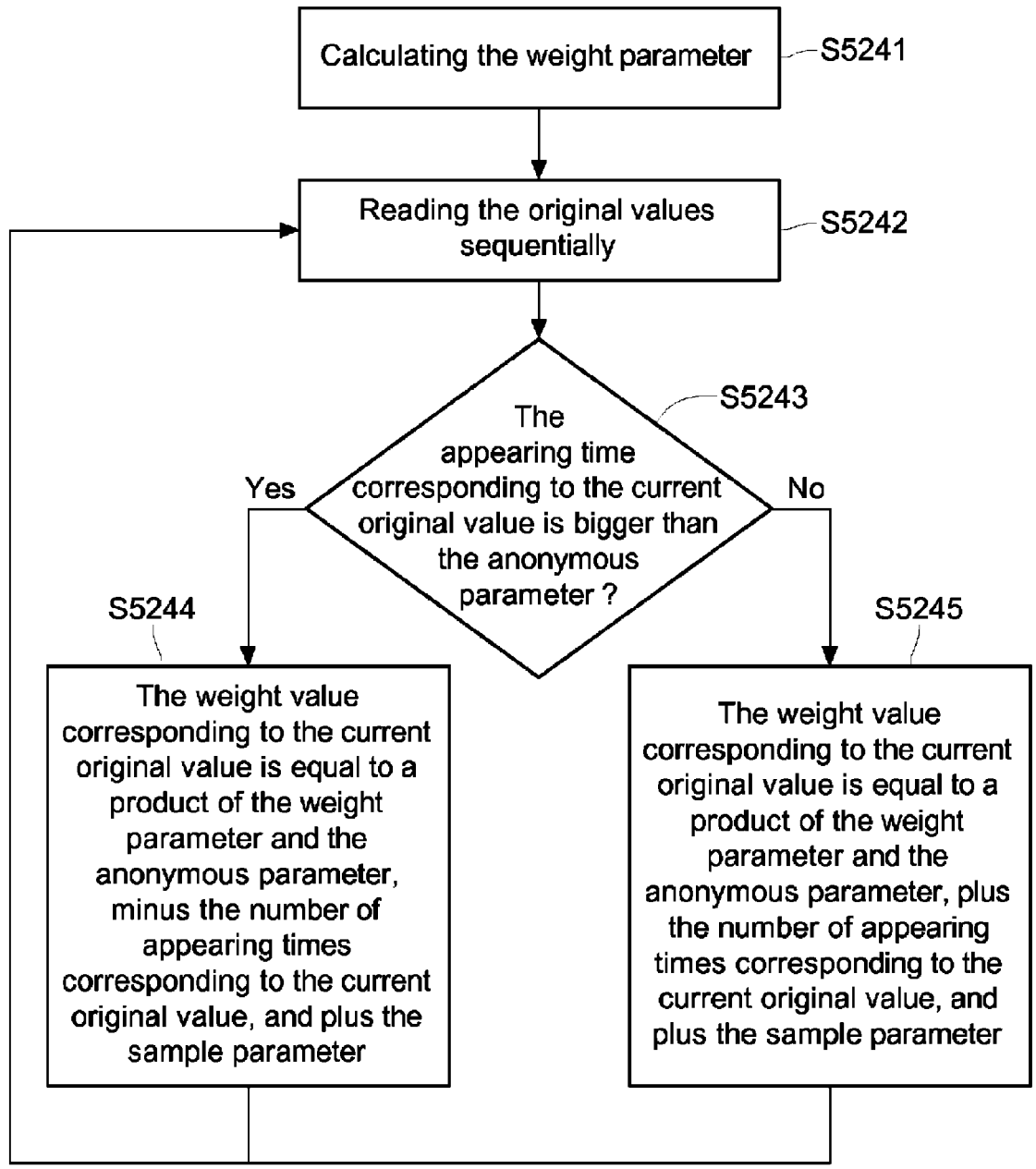
FIG. 15 is a flow chart of the step S524 according to an embodiment of the disclosure.

FIG. 15 is a flow chart of the step S524 according to an embodiment of the disclosure. The weight generation module 42 calculates a weight parameter according to the anonymous parameter (step S5241). According to an embodiment, a product of the weight parameter and the anonymous parameter is bigger than or equal to the largest appearing time. The weight generation module 42 sets a smallest integer value as the weight parameter, and a product of the anonymous parameter and the smallest integer value is bigger than or equal to the largest appearing time. In other words, the weight parameter is equal to a ceiling function value of a quotient of the largest appearing times divided by the anonymous parameter. For example, in Table 5, when the appearing time 6 corresponding to the original value "female" is the largest appearing time, and the anonymous parameter is 3, the weight parameter is 2 (6/3=2).

Then, the weight generation module 42 reads all the original values sequentially (step S5242), and determines whether the appearing time corresponding to the current original value is bigger than the anonymous parameter (step S5243).

When the appearing time corresponding to the current original value is bigger than the anonymous parameter, a weight value corresponding to the current original value is equal to a product of the weight parameter and the anonymous parameter, minus the appearing time corresponding to the current original value, and plus the sample parameter (step S5244). When the appearing time corresponding to the current original value is smaller than or equal to the anonymous parameter, the weight value corresponding to the current original value is equal to a product of the weight parameter and the anonymous parameter, plus the appearing time corresponding to the current original value, and plus the sample parameter (step S5245).

For example, the appearing time of the original value "male" corresponding to the quasi-identifier "sex" is 4, which is bigger than the anonymous parameter 3. Therefore, the weight value corresponding to the original value "male" is equal to 8 (2×3-4+6=8). For another example, the appearing time of the original value "23" corresponding to the quasi-identifier "age" is 2, which is smaller than the anonymous parameter 3. Therefore, the weight value corresponding to the original value "23" is equal to 14 (2×3+2+6=14).

According to the above calculation manner, the weight generation module 42 calculates the weight values corresponding to all the original values and records the weight values in the weight table. An example of the weight table is shown in Table 7 below.

TABLE 7

| Quasi-identifier | Original value | Weight value |
| --- | --- | --- |
| Sex | Female | 8 |
| Sex | Male | 6 |
| Age | 21 | 13 |
| Age | 22 | 8 |
| Age | 23 | 14 |
| Age | 24 | 13 |
| Age | 25 | 14 |
| Postcode | 12111 | 9 |
| Postcode | 12123 | 14 |
| Postcode | 12128 | 9 |
| Postcode | 12177 | 13 |
| Postcode | 12189 | 13 |

After the weight table is generated, the sample generation module 44 divides the original dataset into a plurality of data partitions according to the partition set, and generates a penetration dataset according to the weight table and the data partitions (step S530). The penetration dataset includes a plurality of sample data mentioned previously.

Figure 16:
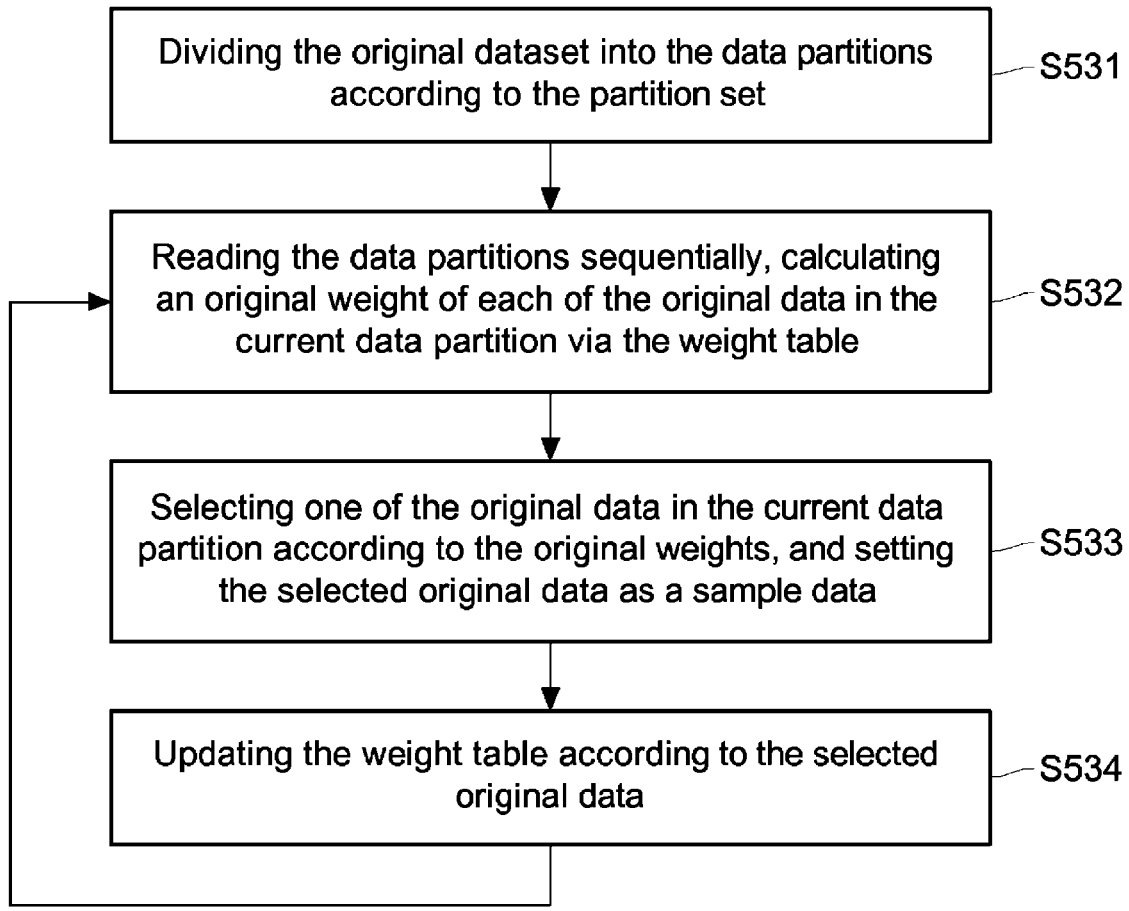
FIG. 16 is a flow chart of the step S530 according to an embodiment of the disclosure.

FIG. 16 is a flow chart of the step S530 according to an embodiment of the disclosure. The sample generation module 44 divides the original dataset into the data partitions according to the partition set (step S531). Each of the data partitions includes at least one of the original data. The data partitions are obtained by dividing the plurality of original data according to the candidate combinations. Herein, a quantity of the obtained data partitions is the original value combinational number corresponding to the partition set. For the previous example, the original dataset is divided into the six data partitions respectively having the corresponding original values "female, 22", "female, 23", "female, 24", "female, 25", "male, 21" and "male, 22", according to the partition set {sex, age}.

The sample generation module 44 reads all the data partitions sequentially, and calculates an original weight of each of the original data in the current data partition via the weight table (step S532). The sample generation module 44 selects one of the original data according to the original weight, and sets the selected original data as a sample data (step S533).

The original weight of the original data is a total of the weight values corresponding to all the original values of the original data. After the original weights of all the original data in the current data partition are obtained, the original data corresponding to the largest original weight can be selected and set as the sample data.

For example, the data partition corresponding to "female, 23" includes the two original data "female, 23, 12123" and "female, 23, 12128". The original weight of the original data "female, 23, 12123" is a total of the weight values of the original values "female", "23" and "12123", which is equal to 36 (8+14+14=36). Similarly, the original weight of the original data "female, 23, 12128" is 31. Because the original weight of the original data "female, 23, 12123" is the largest original weight in the data partition, the sample generation module 44 sets the original data "female, 23, 12123" as the sample data.

Then, the sample generation module 44 updates the weight table according to the selected original data (i.e. the sample data) (step S534). Whenever the sample generation module 44 has selected the sample data in the data partition, the sample generation module 44 updates the weight table according to the newly selected sample data, and then calculates the original weight of a next data partition according to the updated weight table, so as to select a next sample data in the next data partition.

According to an embodiment, in the step S534, the weight value corresponding to the original value of the selected original data is subtracted by 1. For example, the original data "female, 23, 12123" is selected as the sample data, and each of the weight values of the original values "female", "23" and "12123" is subtracted by 1.

By performing the steps S510 to S530, a plurality of distinctive sample data can be obtained from the original dataset, and these sample data can be used for attacking the anonymous dataset which are required to evaluate. The risk evaluation module 46 compares each of the sample data with the plurality of anonymous data of the anonymous dataset for obtaining a plurality of matching quantities respectively corresponding to these sample data (step S540).

Figure 17:
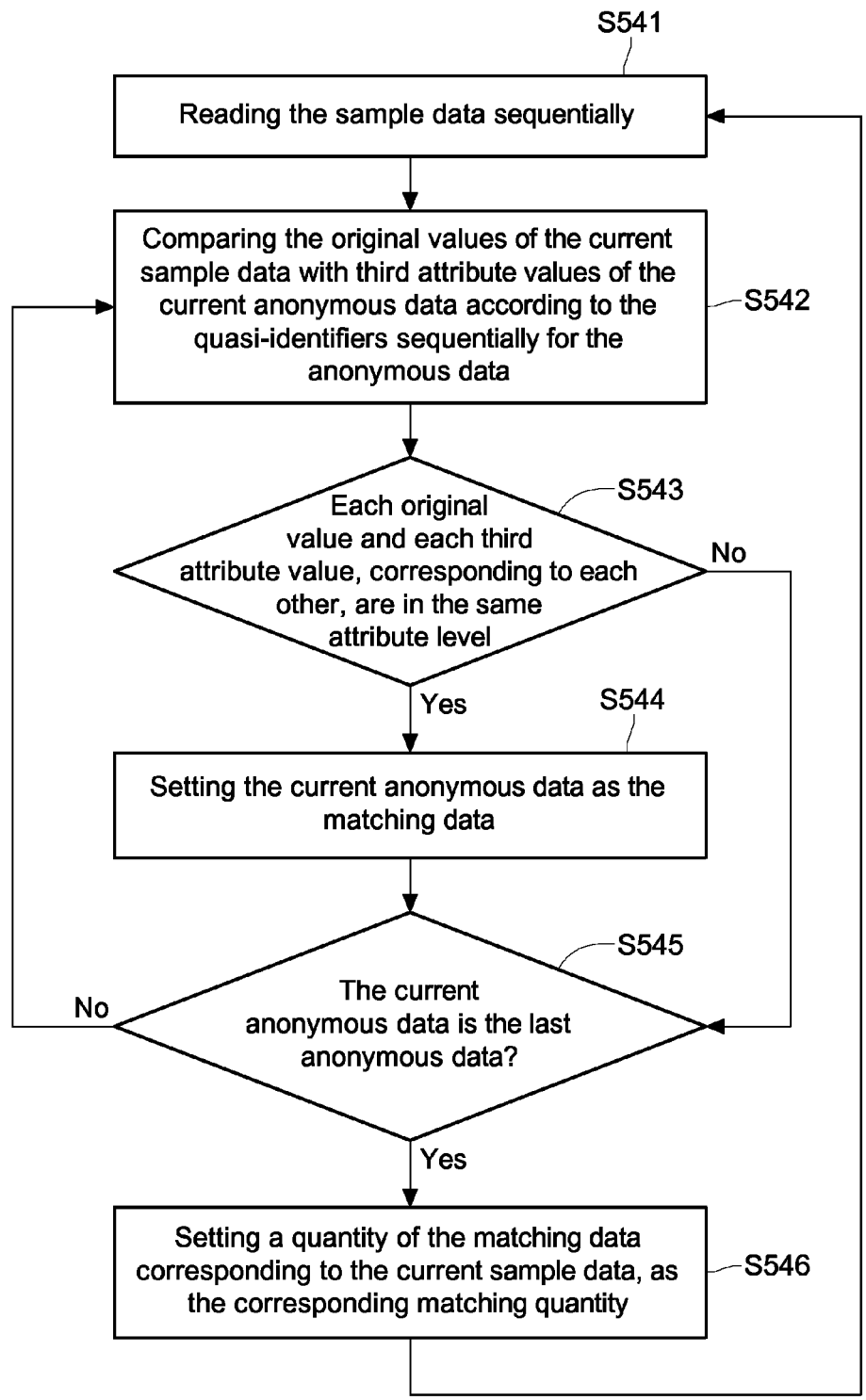
FIG. 17 is a flow chart of the step S540 according to an embodiment of the disclosure.

FIG. 17 is a flow chart of the step S540 according to an embodiment of the disclosure. The risk evaluation module 46 reads all the sample data sequentially (step S541) and performs below steps S542 to S545 for each of the sample data.

The risk evaluation module 46 compares the original value of the current sample data with the third attribute value of the current anonymous data according to the quasi-identifiers for all the anonymous data sequentially (step S542). The risk evaluation module 46 determines whether each of the corresponding original values and each of the third attribute values are in a same attribute level (step S543). When the corresponding original value and the third attribute value are in the same attribute level, the risk evaluation module 46 sets the current anonymous data as a matching data (step S544).

More specifically, the risk evaluation module 46 acquires one of the sample data, and then compares the sample data with each of the anonymous data. The comparisons are repeated until all the sample data have been compared with the anonymous data. When comparing the sample data with the anonymous data, the risk evaluation module 46 sets all the quasi-identifiers as a current attribute one by one, and then compares the original value corresponding to the current attribute, with the third attribute value. For all the quasi-identifiers, if each of the original values and each of the third attribute values are in the same attribute level, it indicates that the sample data is in accordance with the anonymous data. Therefore, the anonymous data can be set as the matching data.

The third attribute value belonging to the numeric type attribute can be a generalized value range. When the original value of the current sample data is in the corresponding generalized value range, the original value of the current sample data and the corresponding third attribute value are in the same attribute level. For example, when the original value is 23, and when the corresponding third attribute value is [23-43], the original value 23 is in the range of [23-43]. Herein, the original value and the third attribute value are in the same attribute level. For another example, the third attribute value is 23, which can be regarded as a range of [23-23]. Therefore, if the corresponding original value is also 23, the original value and the third attribute value are also in the same attribute level.

The third attribute value belonging to the categorical type attribute can be a generalized string. When the original value of the current sample data belongs to the corresponding generalized string, the original value of the current sample data and the corresponding third attribute value are in the same attribute level. Similar to the previous determining manner for searching the smallest generalized model, if the node corresponding to the third attribute value, in the taxonomy tree is not a leaf node, and the node corresponding to the original value belongs to a sub-tree having a root node corresponding to the third attribute value, the original value and the third attribute value are in the same attribute level. For example, the original value "12123" and the third attribute value "121**" are in the same attribute level. Furthermore, if the original value and the third attribute value are the same, it means that they are in the same attribute level.

After one of the sample data is compared with one of the anonymous data, the risk evaluation module 46 determines whether the current anonymous data is the last anonymous data in the anonymous dataset (step S545). If the current anonymous data is not the last anonymous data in the anonymous dataset, the step S542 is performed again for reading a next anonymous data and for the continuous comparison.

On the contrary, when the current anonymous data is the last anonymous data in the anonymous dataset, a quantity of the matching data corresponding to the current sample data can be set as the corresponding matching quantity (step S546). Then, the risk evaluation module 46 returns to the step S541 for reading a next sample data until the matching quantities of all the sample data are calculated.

The risk evaluation module 46 calculates and outputs a risk evaluation result according to the matching quantities (step S550). The risk evaluation result includes a maximum risk probability, a minimum risk probability or an average risk probability. According to an embodiment, a reciprocal of the smallest matching quantity can be set as the maximum risk probability, a reciprocal of the largest matching quantity can be set as the minimum risk probability, and a reciprocal of an average value of the matching quantities can be set as the average risk probability. According to another embodiment, a product of the matching quantity and a quantity of the original data of the corresponding data partition, divided by the total quantity of the original data of the original dataset, can be set as the average risk probability.

The risk evaluation device 40 provides the risk evaluation result to the administrator through the GUI, so that the administrator can determine whether the anonymous dataset can be opened for users under the current risk level. Furthermore, the matching data found via the sample data can be provided to the administrator for a reference. If the administrator considers that the risk is relative higher, the anonymous parameter or the quasi-identifiers can be modified, and the anonymous dataset generation device 30 can be used for re-generating a new anonymous dataset. If the administrator accepts the de-identification result of the anonymous dataset, the current anonymous dataset can be opened for users to perform research or other purposes.

As a conclusion according to the anonymous dataset generation method and device of the disclosure, the equivalence table can be generated according to the critical attributes representing the users' intentions; therefore the users' intentions have already been taken into considerations before generating the cluster table. And, by employing the methods for sorting the equivalence table according to the attribute sequence and for generating the data clusters according to the anchor attributed original values, the extent of data being modified in the data generalization can be reduced. Therefore, by employing the anonymous dataset generation method and device, not only that high authenticity of the critical attributed data can be maintained, the anonymous dataset with a low distortion can be generated under higher execution efficiency.

Furthermore, the risk evaluation method and device of the anonymous dataset of the disclosure can perform the risk evaluation of re-identification for the de-identified anonymous dataset. The risk evaluation method and device of the anonymous dataset generate the weight table and divide the database according to the times each of the original values appears in the original dataset, and perform the risk evaluation for the dangerous sample data sampled from each of the data partitions. Because the quantity of the sample data is far smaller than the total quantity of the original data in the original dataset, the computational quantity and processing time required in the risk evaluation can be reduced substantially.

Note that the specifications relating to the above embodiments should be construed as exemplary rather than as limitative of the disclosure, with many variations and modifications being readily attainable by a person of average skill in the art without departing from the spirit or scope thereof as defined by the appended claims and their legal equivalents.

What is claimed is:

1. A risk evaluation method, applied to a processor for evaluating an anonymous dataset generated according to an original dataset, and comprising:
   acquiring a plurality of numbers of times of appearing respectively corresponding to a plurality of original values of the original dataset;
   generating, by the processor, a partition set and a weight table according to a sample parameter, an anonymous parameter, the numbers of times of appearing and a weight parameter, wherein a product of the weight parameter and the anonymous parameter is bigger than or equal to the largest one of the numbers of times of appearing;
   dividing the original dataset into a plurality of data partitions according to the partition set, and generating a penetration dataset according to the weight table and the data partitions, wherein the penetration dataset comprises a plurality of sample data;
   comparing each sample data with a plurality of anonymous data of the anonymous dataset to obtain a plurality of matching quantities respectively corresponding to the sample data;
   calculating and outputting a risk evaluation result according to the matching quantities; and
   providing the risk evaluation result to an administrator through a graphical user interface (GUI), such that the administrator is configured to determine whether the anonymous dataset is capable of being opened for users under a current risk level.

2. The risk evaluation method according to claim 1, wherein the anonymous dataset has a quasi-identifier set, the quasi-identifier set comprises a plurality of quasi-identifiers, the original dataset comprises the original values corresponding to the quasi-identifiers, and the numbers of times of appearing are the numbers of times the corresponding original values appear in the original dataset, respectively.

3. The risk evaluation method of the anonymous dataset according to claim 2, wherein the step of generating the partition set and the weight table according to the sample parameter, the anonymous parameter and the numbers of times of appearing comprises:
   arranging the quasi-identifiers to generate a plurality of candidate combinations, wherein each of the candidate combinations comprises at least one of the quasi-identifiers;
   calculating a plurality of original value combinational numbers respectively corresponding to the candidate combinations;
   selecting the smallest original value combinational number from at least one of the original value combinational numbers, which is bigger than or equal to the sample parameter, and setting the candidate combination corresponding to the selected original value combinational number, to be the partition set; and
   generating the weight table according to the sample parameter, the anonymous parameter and the numbers of times of appearing.

4. The risk evaluation method according to claim 3, wherein the weight table comprises a plurality of weight values respectively corresponding to the original values, and the step of generating the weight table comprises:
   calculating the weight parameter;
   reading the original values sequentially;
   when the number of times of appearing corresponding to the current original value is bigger than the anonymous parameter, the weight value corresponding to the current original value being equal to the product of the weight parameter and the anonymous parameter, minus the number of times of appearing corresponding to the current original value, and plus the sample parameter; and
   when the number of times of appearing corresponding to the current original value is smaller than or equal to the anonymous parameter, the weight value corresponding to the current original value being equal to the product of the weight parameter and the anonymous parameter, plus the number of times of appearing corresponding to the current original value, and plus the sample parameter.

5. The risk evaluation method according to claim 1, wherein a quantity of the data partitions is bigger than or equal to the sample parameter.

6. The risk evaluation method according to claim 1, wherein the step of dividing the original dataset into the data partitions according to the partition set and generating the penetration dataset according to the weight table and the data partitions, comprises:
   dividing the original dataset into the data partitions according to the partition set, wherein each of the data partitions comprises at least one original data;

reading the data partitions sequentially, and calculating an original weight of each of the at least one original data in the current data partition via the weight table;

selecting one of the at least one original data from the current data partition according to the original weight, and setting the selected original data as one of the sample data; and updating the weight table according to the selected original data.

7. The risk evaluation method according to claim 6, wherein the anonymous dataset comprises a quasi-identifier set, the quasi-identifier set comprises a plurality of quasi-identifiers, each original data comprises the original values respectively corresponding to the quasi-identifiers, the original values respectively correspond to a plurality of weight values of the weight table, and the step of updating the weight table according to the selected original data comprises:

subtracting the weight values corresponding to the selected original data by 1.

8. The risk evaluation method according to claim 1, wherein the anonymous dataset comprises a quasi-identifier set, the quasi-identifier set comprises a plurality of quasi-identifiers, each sample data comprises the original values respectively corresponding to the quasi-identifiers, each anonymous data comprises a plurality of third attribute values respectively corresponding to the quasi-identifiers, and the step of comparing each sample data with the plurality of anonymous data of the anonymous dataset to obtain the matching quantities respectively corresponding to the sample data, comprises:

reading the plurality of sample data sequentially, and for each sample data, performing steps of:

comparing the original values of the current sample data with the third attribute values of the current anonymous data according to the quasi-identifiers for the plurality of anonymous data sequentially;

setting the current anonymous data as a matching data when each original value and each third attribute value, which correspond to each other, are in a same attribute level; and setting a quantity of the matching data corresponding to the current sample data, to be the corresponding matching quantity.

9. The risk evaluation method according to claim 8, wherein each of the third attribute values belonging to a numeric type attribute is a generalized value range, when the original value of the current sample data is in the corresponding generalized value range, the original value of the current sample data and the corresponding third attribute value are at the same attribute level; and each of the third attribute values belonging to a categorical type attribute is a generalized string, when the original value of the current sample data belongs to the corresponding generalized string, the original value of the current sample data and the corresponding third attribute value are at the same attribute level.

10. The risk evaluation method according to claim 1, wherein the risk evaluation result comprises a maximum risk probability, a minimum risk probability or an average risk probability.

11. A risk evaluation device for evaluating an anonymous dataset generated according to an original dataset, comprising:

a memory, for storing data or storing data temporarily; and a processor, coupled to the memory, and comprising:

a weight generation module, for acquiring a plurality of numbers of times of appearing respectively corresponding to a plurality of original values of the original dataset, and for generating a partition set and a weight table according to a sample parameter, an anonymous parameter, the numbers of times of appearing and a weight parameter, wherein a product of the weight parameter and the anonymous parameter is bigger than or equal to the largest one of the numbers of times of appearing;

a sample generation module, for dividing the original dataset into a plurality of data partitions according to the partition set, and for generating a penetration dataset according to the weight table and the data partitions, wherein the penetration dataset comprises a plurality of sample data; and a risk evaluation module, for comparing each sample data with a plurality of anonymous data of the anonymous dataset in order to obtain a plurality of matching quantities respectively corresponding to the plurality of sample data, and for calculating and outputting a risk evaluation result according to the matching quantities, wherein the risk evaluation result is provided to an administrator through a graphical user interface (GUI), such that the administrator is configured to determine whether the anonymous dataset is capable of being opened for users under a current risk level.

12. The risk evaluation device according to claim 11, wherein the anonymous dataset comprises a quasi-identifier set, the quasi-identifier set comprises a plurality of quasi-identifiers, the original dataset comprises the original values corresponding to the quasi-identifiers, and the numbers of times of appearing are the numbers of times the corresponding original values appear in the original dataset, respectively.

13. The risk evaluation device according to claim 12, wherein the weight generation module performs steps of:

arranging the quasi-identifiers to generate a plurality of candidate combinations, wherein each of the candidate combinations comprises at least one of the quasi-identifiers;

calculating a plurality of original value combinational numbers respectively corresponding to the candidate combinations;

selecting the smallest one from at least one of the original value combinational numbers bigger than or equal to the sample parameter, and setting the candidate combination corresponding to the smallest original value combinational number, to be the partition set; and generating the weight table according to the sample parameter, the anonymous parameter and the numbers of times of appearing.

14. The risk evaluation device according to claim 13, wherein the weight table comprises a plurality of weight values respectively corresponding to the original values, and in the step of generating the weight table, the weight generation module performs steps of:

calculating the weight parameter;

reading the original values sequentially;

when the number of times of appearing corresponding to the current original value is bigger than the anonymous parameter, the weight value corresponding to the current original value is equal to the product of the weight parameter and the anonymous parameter, minus the number of times of appearing corresponding to the current original value, and plus the sample parameter; and when the number of times of appearing corresponding to the current original value is smaller than or equal to the anonymous parameter, the weight value corresponding to the current original value is equal to the product of the weight parameter and the anonymous parameter, plus the number of times of appearing corresponding to the current original value, and plus the sample parameter.

15. The risk evaluation device according to claim 11, wherein a quantity of the data partitions is bigger than or equal to the sample parameter.

16. The risk evaluation device according to claim 11, wherein the sample generation module performs steps of:
dividing the original dataset into the data partitions according to the partition set, wherein each of the data partitions comprises at least one original data;
reading the data partitions sequentially, and calculating an original weight of each of the at least one original data in the current data partition via the weight table;
selecting one of the at least one original data from the current data partition according to the original weight, and setting the selected original data as one of the plurality of sample data; and
updating the weight table according to the selected original data.

17. The risk evaluation device according to claim 16, wherein the anonymous dataset has a quasi-identifier set, the quasi-identifier set comprises a plurality of quasi-identifiers, each original data comprises the original values corresponding to the quasi-identifiers respectively, the original values respectively correspond to the weight values of the weight table, and the sample generation module performs a step of:
subtracting the weight values corresponding to the selected original data by 1.

18. The risk evaluation device according to claim 11, wherein the anonymous dataset has a quasi-identifier set, the quasi-identifier set comprises a plurality of quasi-identifiers, each sample data comprises the original values respectively corresponding to the quasi-identifiers, each anonymous data comprises a plurality of third attribute values respectively corresponding to the quasi-identifiers, and the risk evaluation module performs steps of:
reading the plurality of sample data sequentially, and for each sample data, performing steps of:
comparing the original values of the current sample data with the third attribute values of the current anonymous data according to the quasi-identifiers for the plurality of anonymous data sequentially;
setting the current anonymous data as a matching data when each original value and each third attribute value, which correspond to each other, are at a same attribute level; and
setting a quantity of the matching data corresponding to the current sample data, to be the corresponding matching quantity.

19. The risk evaluation device according to claim 18, wherein each of the third attribute values belonging to a numeric type attribute is a generalized value range, when the original value of the current sample data is in the corresponding generalized value range, the original value of the current sample data and the corresponding third attribute value are at the same attribute level; and each of the third attribute values belonging to a categorical type attribute is a generalized string, when the original value of the current sample data belongs to the corresponding generalized string, the original value of the current sample data and the corresponding third attribute value are at the same attribute level.

20. The risk evaluation device according to claim 11, wherein the risk evaluation result comprises a maximum risk probability, a minimum risk probability or an average risk probability.

* * * * *